(12) United States Patent
Martin

(10) Patent No.: US 9,902,344 B2
(45) Date of Patent: Feb. 27, 2018

(54) ADAPTER PLATE FOR MOUNTING A LICENSE PLATE ONTO A VEHICLE

(71) Applicant: Darren Martin, Surrey (CA)

(72) Inventor: Darren Martin, Surrey (CA)

( * ) Notice: Subject to any disclaimer, the term of this patent is extended or adjusted under 35 U.S.C. 154(b) by 0 days.

(21) Appl. No.: 15/098,000

(22) Filed: Apr. 13, 2016

(65) Prior Publication Data

US 2016/0221516 A1  Aug. 4, 2016

Related U.S. Application Data

(63) Continuation-in-part of application No. 14/569,481, filed on Dec. 12, 2014.

(30) Foreign Application Priority Data

Dec. 14, 2015 (CA) ..................................... 2915078

(51) Int. Cl.
*G09F 7/00* (2006.01)
*B60R 13/10* (2006.01)

(52) U.S. Cl.
CPC .................................. *B60R 13/105* (2013.01)

(58) Field of Classification Search
USPC ............................................................ 40/210
See application file for complete search history.

(56) References Cited

U.S. PATENT DOCUMENTS

| | | | |
|---|---|---|---|
| 1,154,847 A | 9/1915 | De Vore | |
| 1,575,950 A * | 3/1926 | Thorn | B60R 13/105 40/202 |
| 1,692,469 A | 11/1928 | Rex | |
| 2,062,156 A | 11/1936 | Zerbst | |
| 2,266,715 A | 12/1941 | Parrott | |
| 2,305,750 A | 12/1942 | Vokaty | |
| 2,406,286 A | 8/1946 | Gantnier | |
| 2,518,669 A * | 8/1950 | Dickson | B60R 13/105 40/200 |
| 2,661,558 A * | 12/1953 | Salisbury | G09F 3/0305 292/317 |
| 2,710,475 A | 6/1955 | Salzmann | |

(Continued)

FOREIGN PATENT DOCUMENTS

| | | |
|---|---|---|
| DE | 102007047674 | 4/2009 |
| EP | 0739775 A1 | 10/1996 |
| EP | 2064090 B1 | 10/2010 |

OTHER PUBLICATIONS

English Abstract of DE102007047674.

(Continued)

*Primary Examiner* — Kristina N Junge
(74) *Attorney, Agent, or Firm* — Cameron IP

(57) ABSTRACT

There is provided an adapter plate assembly for mounting a license plate to a vehicle. The assembly includes an adapter plate to which the license plate is connectable. The assembly includes a resilient member. The resilient member has a first portion connectable with the adapter plate. The resilient member has a second portion connectable to the vehicle. The assembly further includes, according to one aspect, an elongate backing member. The first portion of the resilient member is connectable with and interposable between the backing member and the adapter plate.

23 Claims, 24 Drawing Sheets

(56) References Cited

U.S. PATENT DOCUMENTS

| | | | | |
|---|---|---|---|---|
| 3,439,440 | A | * | 4/1969 | Klekamp ................ B60R 13/10 40/209 |
| 3,509,653 | A | * | 5/1970 | Hummel ................... G09F 7/18 40/200 |
| D245,497 | S | | 8/1977 | Ritch |
| 4,314,417 | A | | 2/1982 | Cain |
| D285,784 | S | | 9/1986 | Langensiepen |
| 4,958,451 | A | | 9/1990 | Iwakura et al. |
| D311,167 | S | | 10/1990 | Ching-Hwei |
| 5,027,537 | A | | 7/1991 | Freeman et al. |
| 5,073,842 | A | | 12/1991 | Monroe |
| 5,255,767 | A | | 10/1993 | Norwood |
| 5,662,302 | A | | 9/1997 | Berry, Jr. |
| 5,692,327 | A | | 12/1997 | Wynne et al. |
| 5,878,516 | A | * | 3/1999 | Amirian ................... G09F 21/04 248/300 |
| 6,592,137 | B2 | | 7/2003 | Grove |
| 6,757,998 | B1 | * | 7/2004 | Lucatorto ............. B60R 13/105 40/200 |
| 6,957,820 | B1 | | 10/2005 | Stefani |
| 7,073,618 | B1 | | 7/2006 | Song |
| D528,953 | S | | 9/2006 | Kellermann |
| D533,828 | S | | 12/2006 | Reimitz |
| D534,110 | S | | 12/2006 | Kellermann |
| 7,200,961 | B2 | * | 4/2007 | Yeo ....................... B60R 13/105 40/209 |
| D599,726 | S | | 9/2009 | Pacleb |
| 7,883,064 | B2 | | 2/2011 | Luft et al. |
| D633,837 | S | | 3/2011 | Murray |
| 8,245,996 | B1 | | 8/2012 | Ciabaszewski |
| 8,695,243 | B1 | | 4/2014 | Aldasem |
| 2003/0182829 | A1 | | 10/2003 | Simonazzi |
| 2004/0079007 | A1 | | 4/2004 | Hashim et al. |
| 2004/0079009 | A1 | | 4/2004 | Arrua |
| 2004/0170024 | A1 | | 9/2004 | Sheu et al. |
| 2005/0087575 | A1 | | 4/2005 | Samsel et al. |
| 2006/0156595 | A1 | * | 7/2006 | Kasak ................... B60R 13/105 40/209 |
| 2007/0101624 | A1 | | 5/2007 | Records |
| 2008/0054677 | A1 | | 3/2008 | McGee |
| 2010/0101123 | A1 | * | 4/2010 | Pacleb ................. B60R 13/105 40/209 |
| 2012/0248283 | A1 | | 10/2012 | Chen |
| 2014/0133935 | A1 | * | 5/2014 | MacNeil ................... G09F 7/18 411/337 |
| 2014/0237870 | A1 | | 8/2014 | Eidsmore |
| 2014/0263923 | A1 | | 9/2014 | McKinney |
| 2014/0331530 | A1 | * | 11/2014 | Masanek, Jr. ......... B60R 13/105 40/209 |

OTHER PUBLICATIONS

English Abstract of EP2064090 A2.

"PEMSERT(R) Self-clinching Flush Fasteners", pp. F4-714 and F4-2, PennEngineering, Danboro, PA, USA, 2014.

* cited by examiner

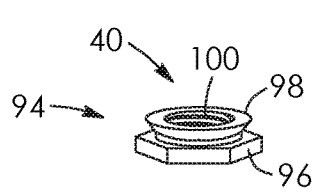
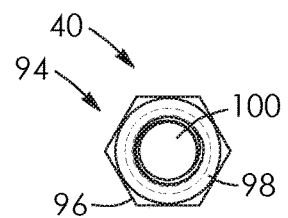
FIG. 7
(PRIOR ART)
FIG. 8
(PRIOR ART)
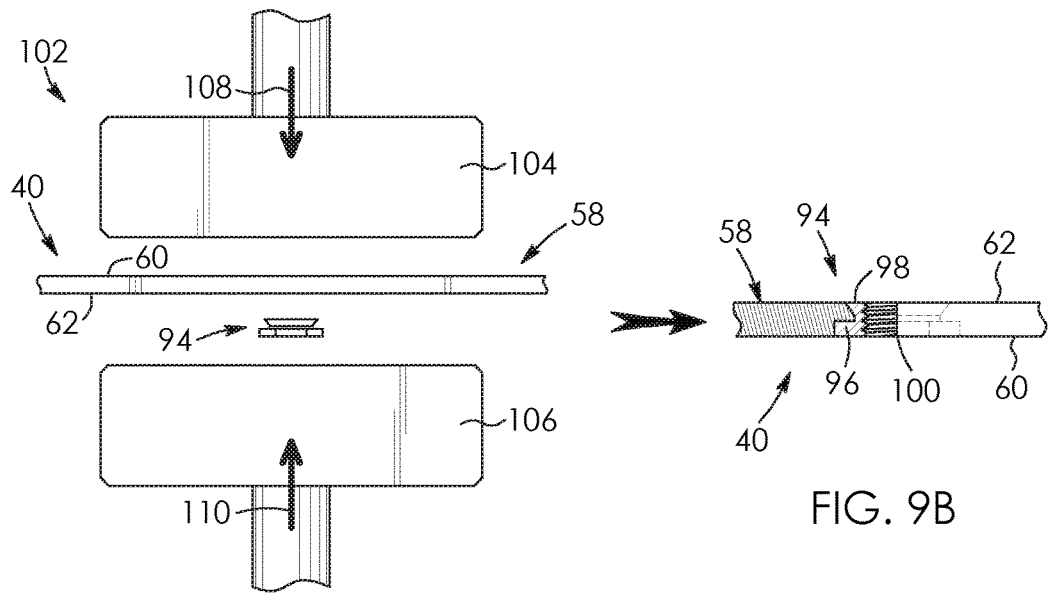
FIG. 9A
FIG. 9B

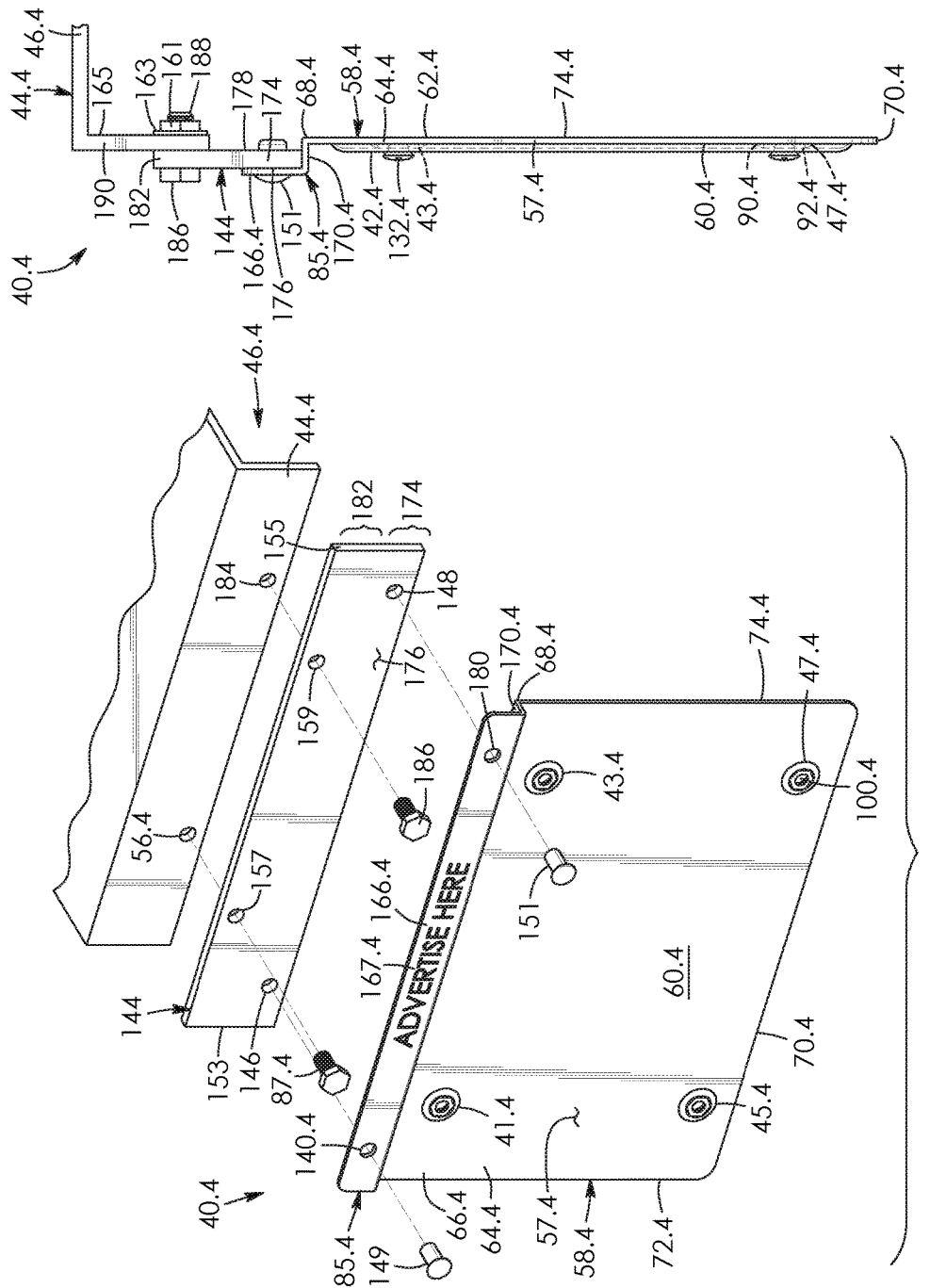

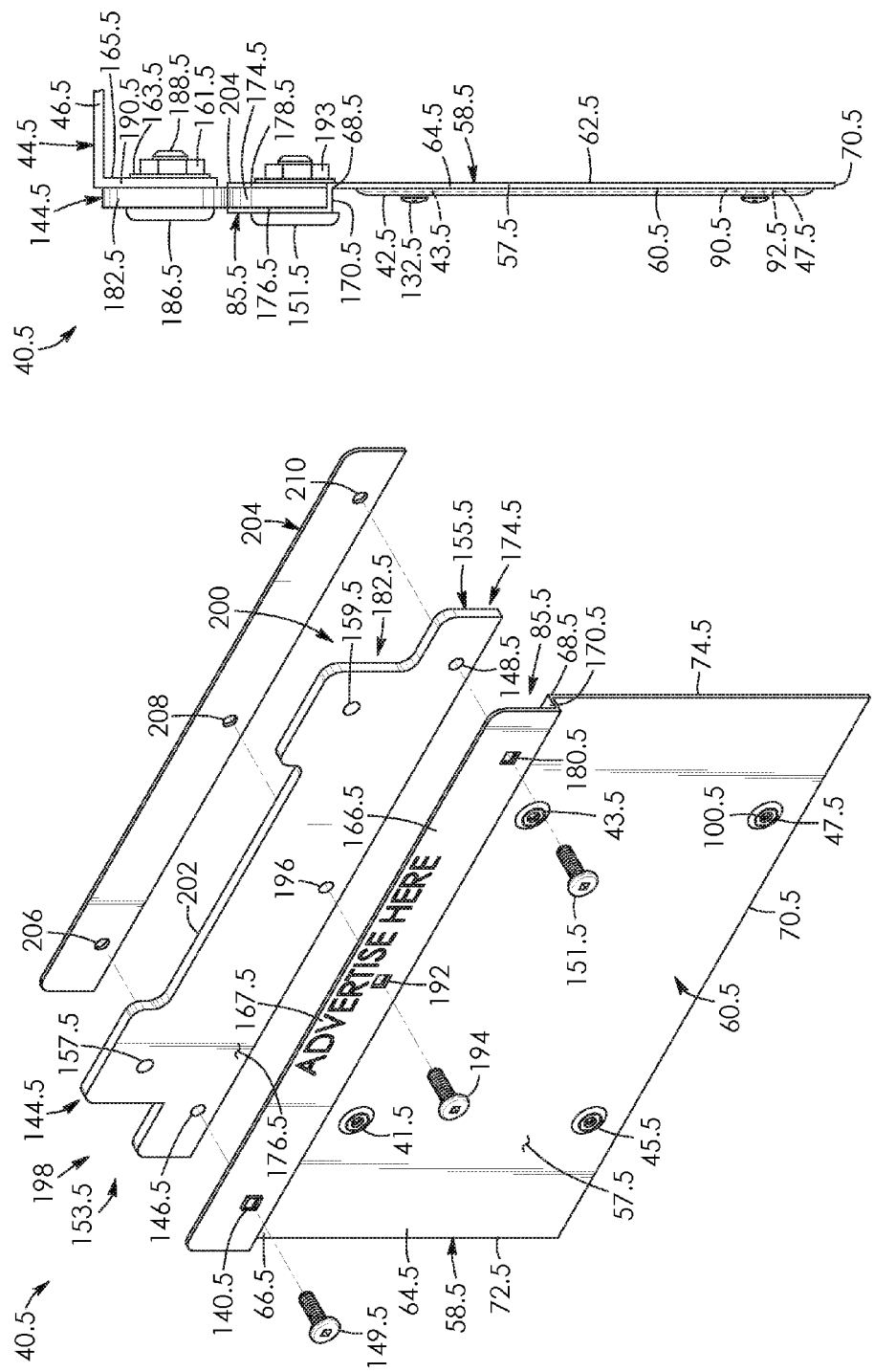

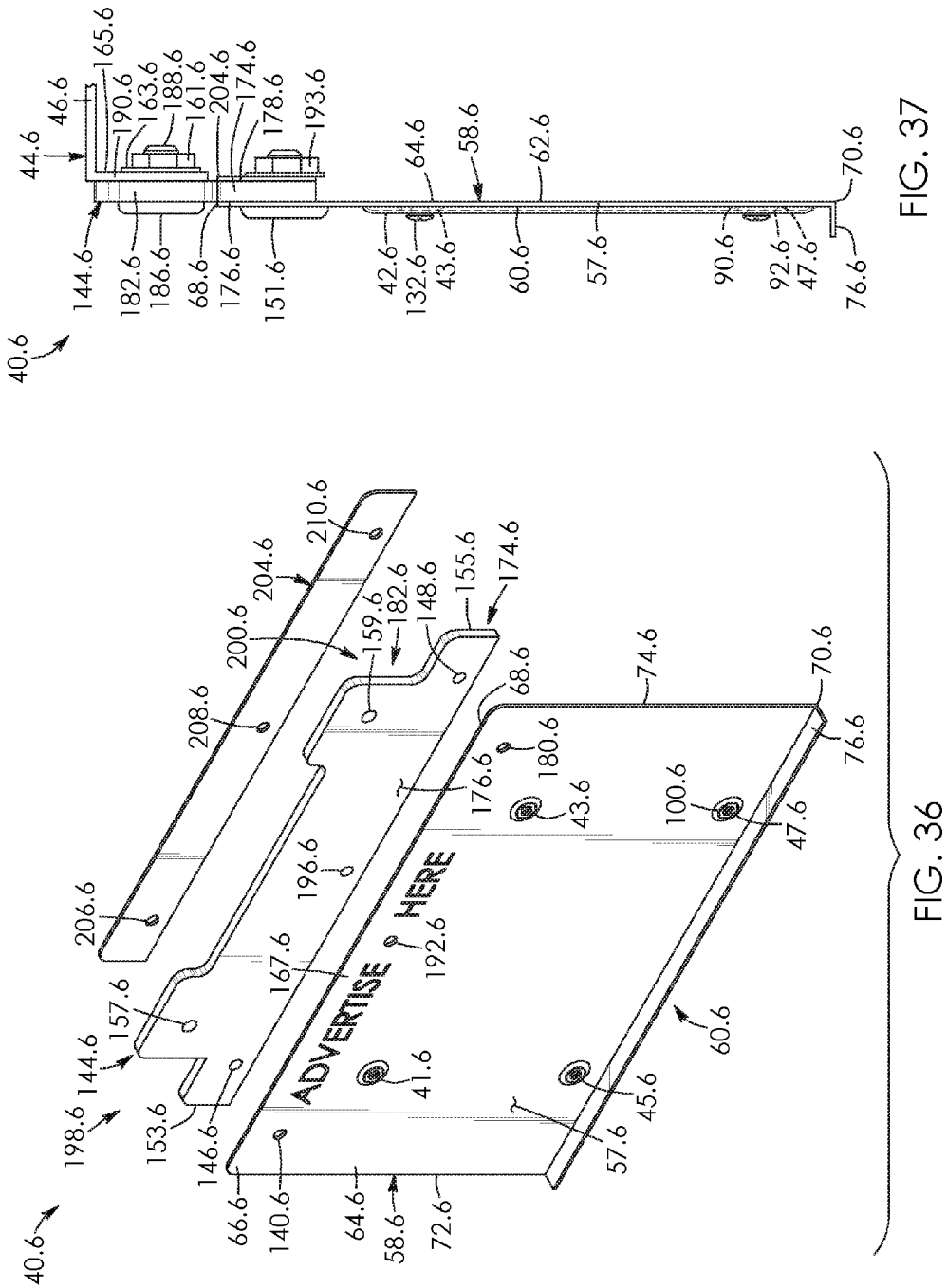

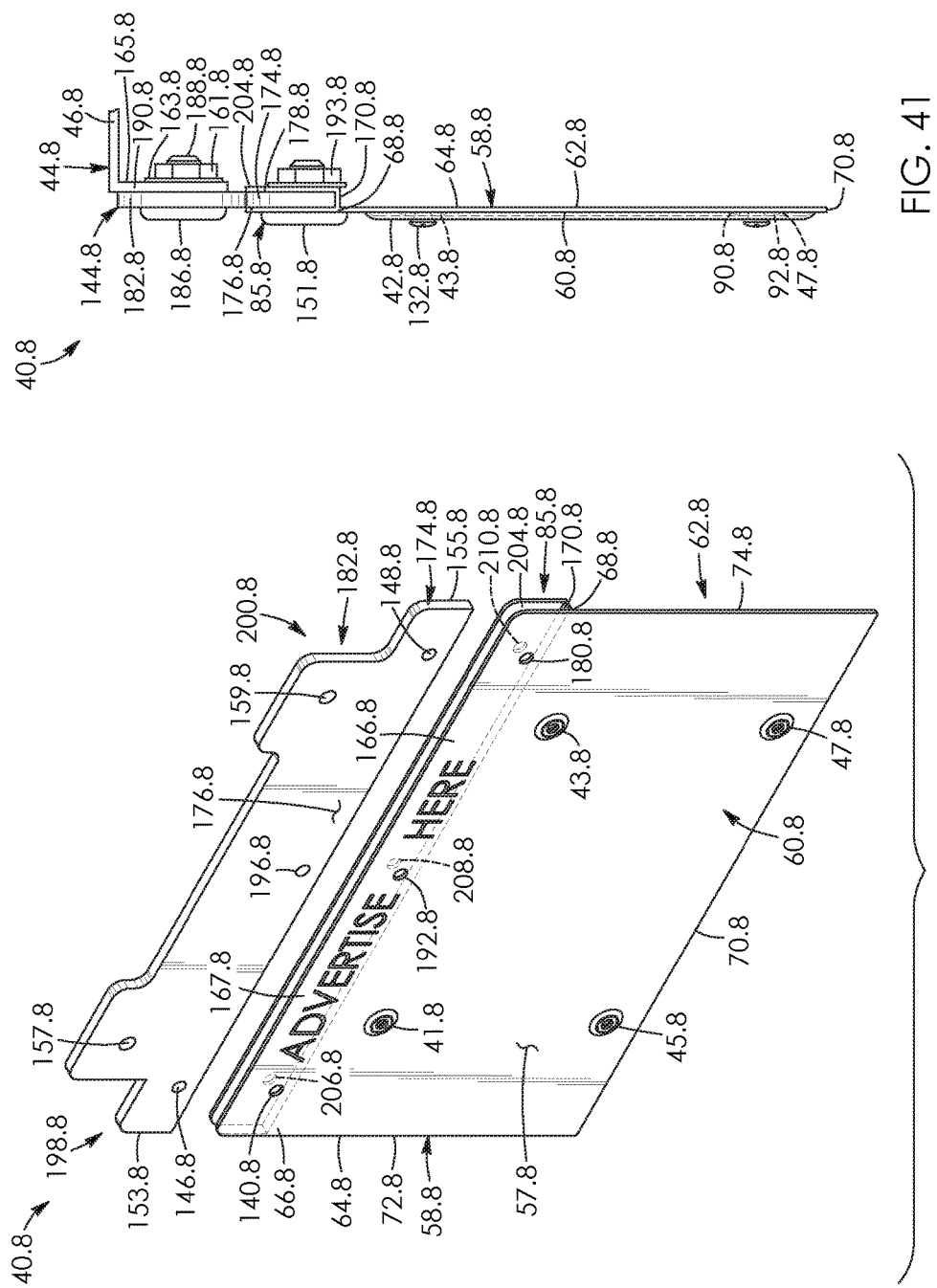

000

ADAPTER PLATE FOR MOUNTING A LICENSE PLATE ONTO A VEHICLE

FIELD OF THE INVENTION

There is provided an adapter plate. In particular, there is provided an adapter plate for mounting a license place onto a vehicle.

DESCRIPTION OF THE RELATED ART

U.S. Patent Publication No. 2010/0101123 to Pacleb provides a license plate holder for automobiles which allows the maximum viewable area for the plate and offers weather protection. This license plate holder allegedly avoids the problem of the license plate frame, tabs and mounting holes covering portions of the plate. The plate is held firmly in the cover even when the plate thickness varies and the cover attaches to the automobile at the back side.

U.S. Patent Publication No. 2014/0237870 to Eidsmore provides a license plate frame dimensioned for receipt around an associated license plate. The frame includes a first portion in parallel, spaced relation from a second portion and joined thereto along opposite ends by first and second interconnection portions. A handle extends outwardly from a first face of the second portion. First and second spaced openings along the first portion receive associated fasteners to secure the frame to the associated license plate and associated vehicle. First and second spaced-apart, segmented studs (circular or non-circular) extend outwardly from a second face of the second portion for receipt in corresponding openings in the associated license plate, or to abut against an outer surface thereof. The handle includes a first, upper surface and a second, lower surface, the lower surface including a region dimensioned for advertising.

BRIEF SUMMARY OF INVENTION

There is provided, and it is an object to provide, an improved adapter plate assembly disclosed.

There is accordingly provided an adapter plate assembly for mounting a license plate to a vehicle. The assembly includes an adapter plate to which the license plate is connectable. The assembly includes a resilient member. The resilient member has a first portion connectable with the adapter plate. The resilient member has a second portion connectable to the vehicle.

There is further provided an adapter plate assembly for mounting a license plate to a vehicle. The assembly comprises an adapter plate to which the license plate is connectable. The adapter plate includes an upper peripheral portion that is L-shaped in cross-section. The assembly further comprises a resilient member. The resilient member has a first portion received by and coupled to the upper peripheral portion of the adapter plate. The resilient member has a second portion connectable to the vehicle.

There is also provided an adapter plate assembly for mounting a license plate to a vehicle. The assembly comprises an adapter plate to which the license plate is connectable. The adapter plate includes a receptacle at an upper peripheral portion thereof. The receptacle is U-shaped in cross-section. The assembly further comprises a resilient member. The resilient member has a first portion received within and coupled to the receptacle. The resilient member has a second portion connectable to the vehicle.

BRIEF DESCRIPTION OF DRAWINGS

The invention will be more readily understood from the following description of preferred embodiments thereof given, by way of example only, with reference to the accompanying drawings, in which:

FIG. 7 is a perspective view of a female threaded connector of the adapter plate assembly;

FIG. 8 is a top plan view thereof;

FIG. 9A is an elevation view of a metal sheet and the connector of FIG. 7 positioned within a press assembly according to one aspect, for embedding the connector within the sheet;

FIG. 9B is an elevation view partially in cross-section of the sheet of FIG. 9A, with the connector embedded within the sheet and being shown partially in cross-section;

FIG. 32 is an exploded rear, top perspective view of an adapter plate assembly according to a fourth aspect, and a bracket for a rear portion of a trailer, the bracket being according to a fourth aspect and the trailer being shown in fragment;

FIG. 33 is a right side elevation view of the adapter plate assembly coupled to a license plate and the bracket of the trailer shown in FIG. 32;

FIG. 34 is an exploded, rear, top perspective of an adapter plate assembly according to a fifth aspect, and a bracket for a rear portion of a trailer, the bracket being similar to that shown in FIG. 32 and the trailer being shown in fragment;

FIG. 35 is a right side elevation view of the adapter plate assembly coupled to a license plate and the bracket of the trailer shown in FIG. 34;

FIG. 36 is an exploded, rear, top perspective view of an adapter plate assembly according to a sixth aspect, and a bracket for a rear portion of a trailer, the bracket being similar to that shown in FIG. 32 and the trailer being shown in fragment;

FIG. 37 is a right side elevation view of the adapter plate assembly coupled to a license plate and the bracket of the trailer shown in FIG. 36;

FIG. 40 is an exploded rear, top perspective of an adapter plate assembly according to a eighth aspect, and a bracket for a rear portion of a trailer, the bracket being similar to that shown in FIG. 32 and the trailer being shown in fragment; and FIG. 41 is a right side elevation view of the adapter plate assembly coupled to a license plate and the bracket of the trailer shown in FIG. 40.

DESCRIPTION OF THE PREFERRED EMBODIMENTS

Figure 1:
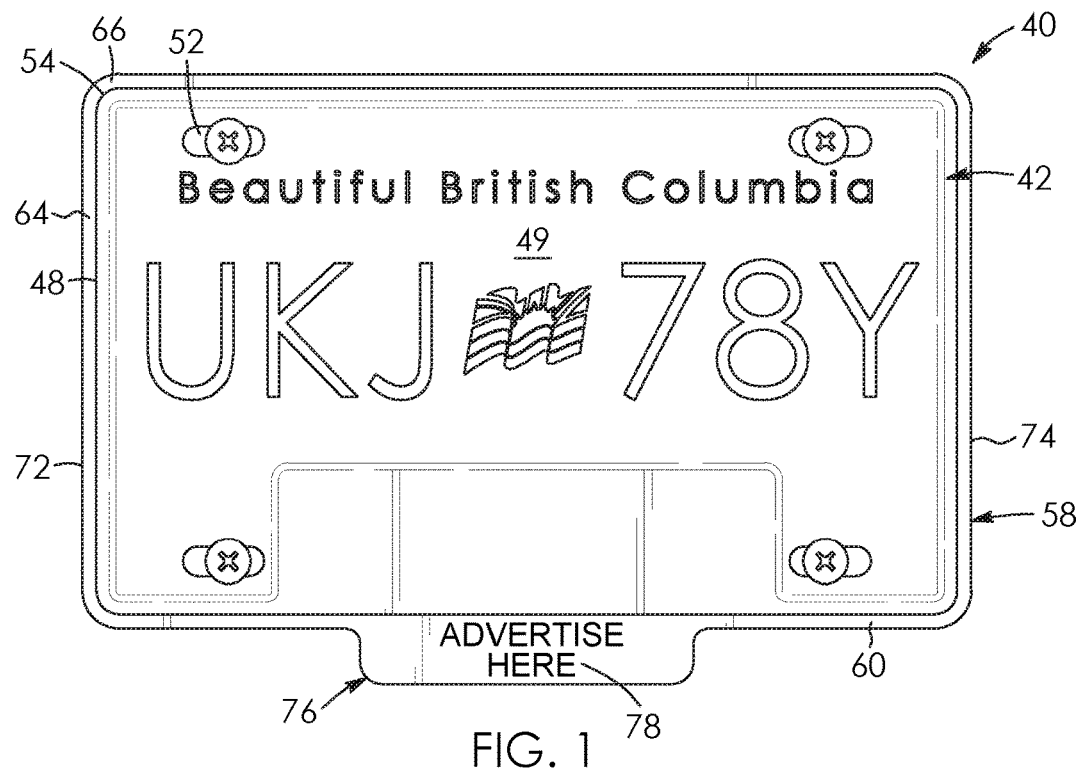
FIG. 1 is a front elevation view of an adapter plate assembly according to a first aspect, and a license plate connected thereto.
Figure 11:
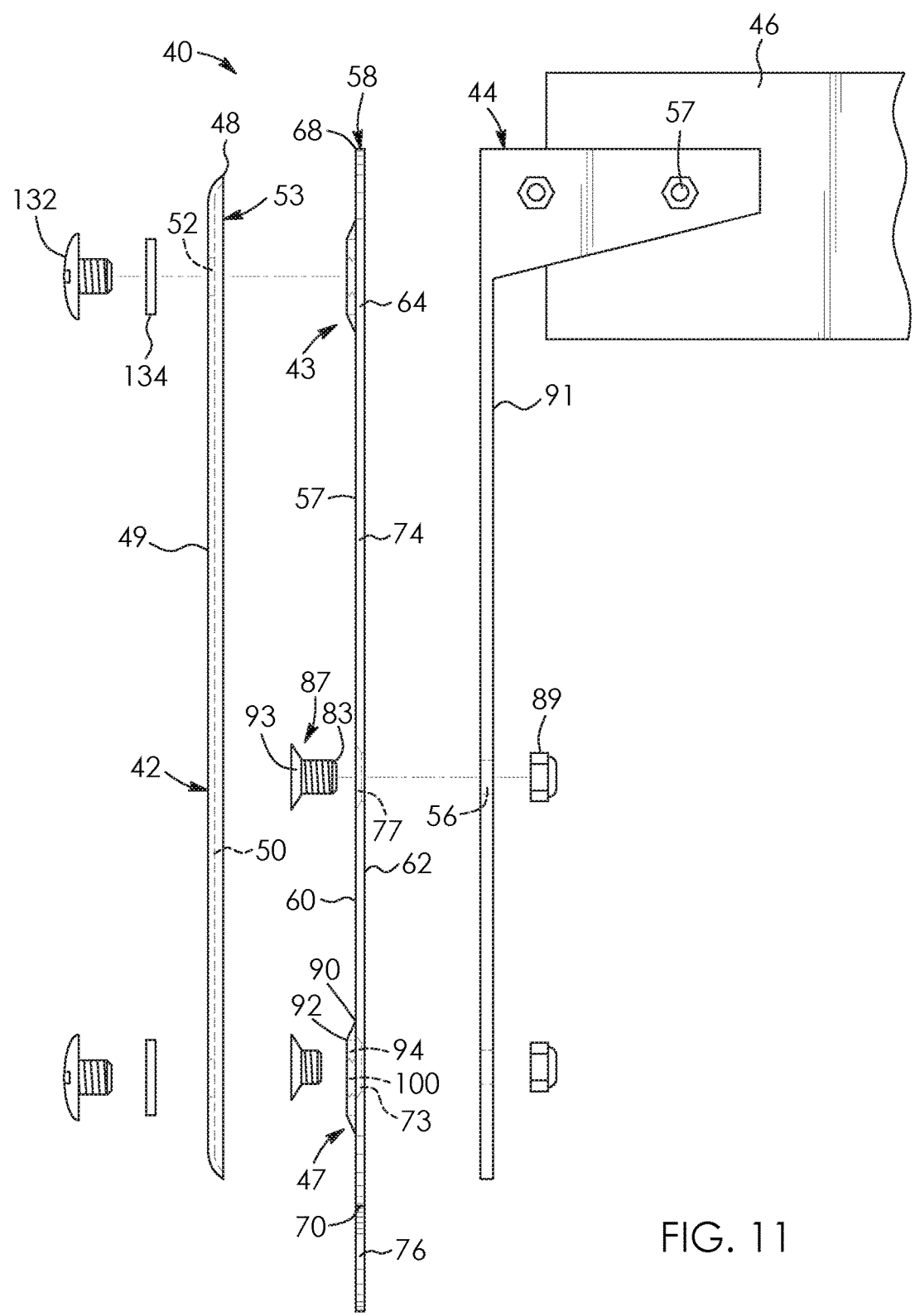
FIG. 11 is an exploded, side elevation view of the license plate and the adapter plate assembly of FIG. 1, a bracket of a vehicle according to one aspect and a fragmented portion of said vehicle.

Referring to the drawings and first to FIG. 1, there is shown an adapter plate assembly 40 for mounting a license plate 42 to a connector portion, in this example a bracket 44 of a vehicle 46, seen in FIG. 11. The vehicle may be a truck, trailer or motorcycle, for example, and is shown in fragment.

Figure 2:
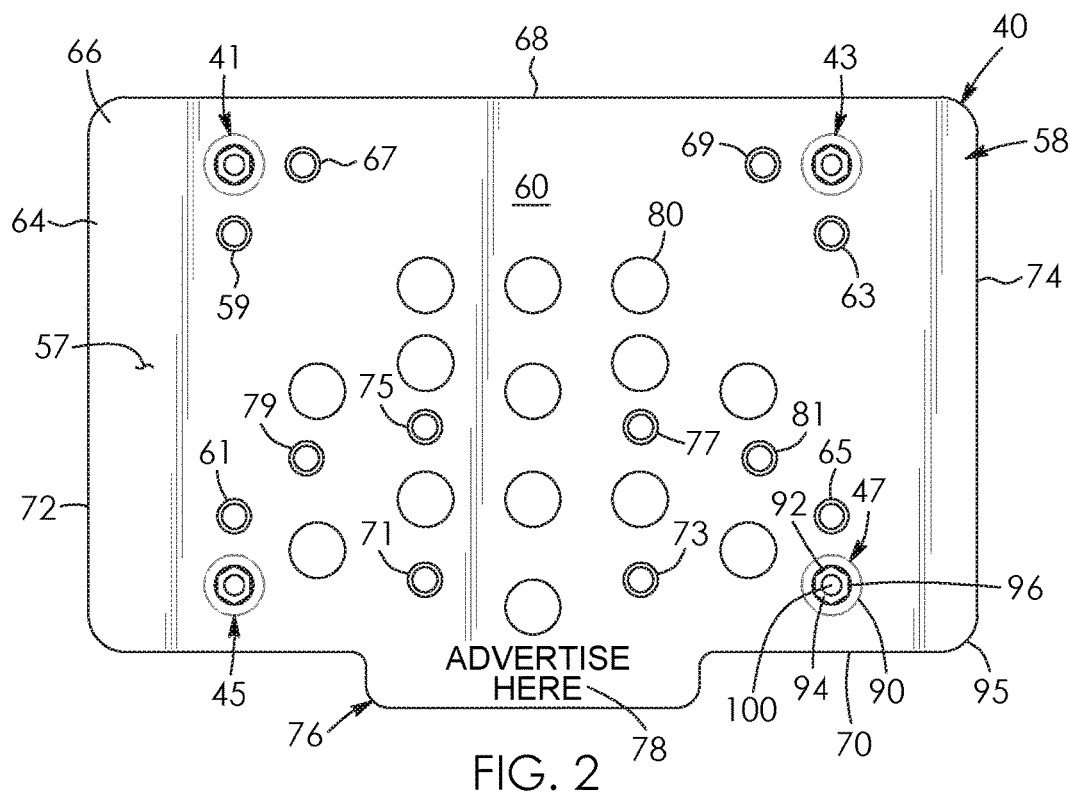
FIG. 2 is a front elevation view of the adapter plate assembly with the licensed plate of FIG. 1 removed.

As seen in FIGS. 1 and 2, the license plate is generally rectangular and has a peripheral rim portion 48. Referring to FIG. 11, the license plate 42 has a front 49 and a recessed rear 50 opposite the front. The recessed rear is centrally-located relative to the rim portion. The rim portion 48 and rear 50 of the license plate 42 form a recessed interior region 53. The license plate has a plurality of corners and a plurality of spaced-apart outer apertures extending therethrough adjacent to corners thereof, as seen in FIG. 1 by aperture 52 positioned adjacent to corner 54. The license plate, including its various parts and functions, is conventional.

Referring to FIG. 11, the bracket 44 has a plurality of inner or peripheral apertures extending therethrough, as shown by aperture 56. The bracket couples to the vehicle 46 in a conventional manner, in this example via bolts 57.

Figure 3:
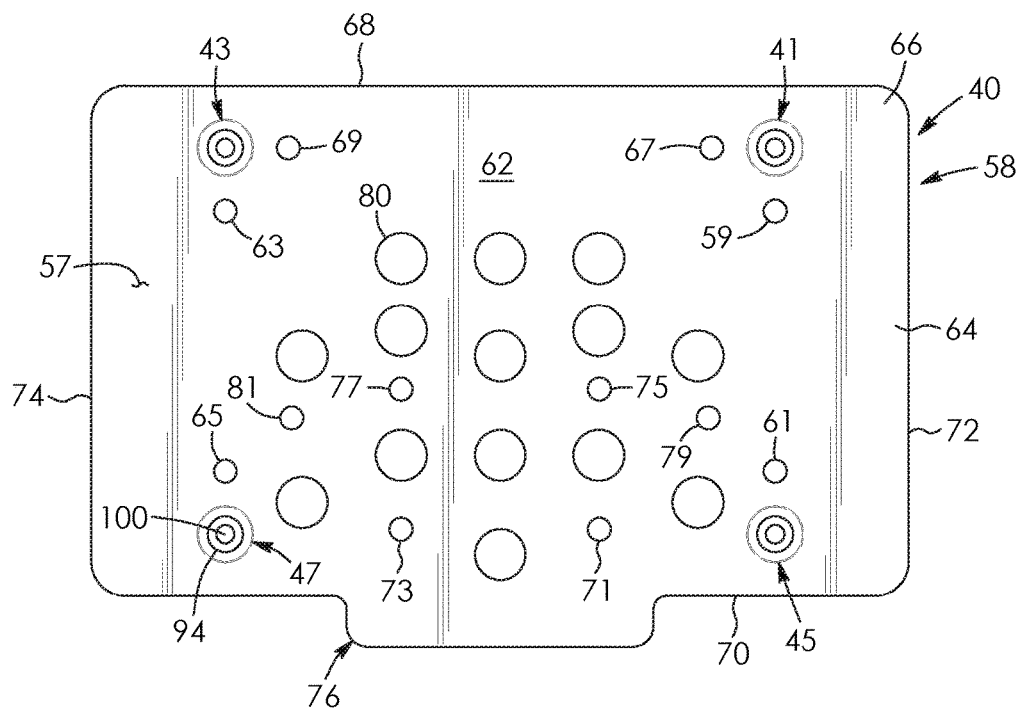
FIG. 3 is a rear elevation view thereof.
Figure 4:
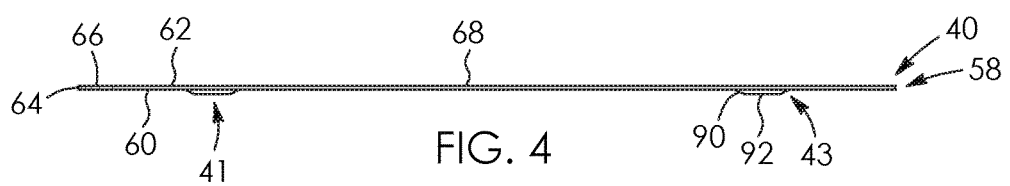
FIG. 4 is a top plan view thereof.
Figure 5:
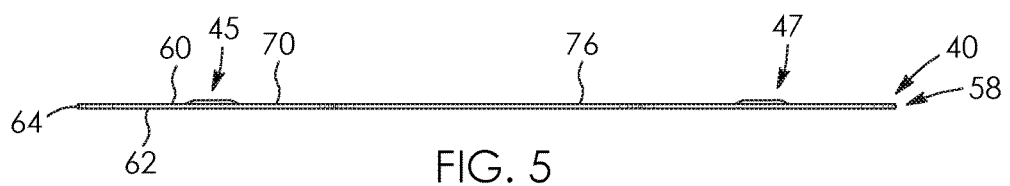
FIG. 5 is bottom plan view thereof.

As seen in FIG. 2, adapter plate assembly 40 includes an adapter plate 58 that is made of aluminum sheet in this example. However, this is not strictly required and the plate need not be made of aluminum and may be made of other materials in other examples. The adapter plate 58 has a front 60 which faces the recessed rear 50 of the license plate 42 seen in FIG. 11. As seen in FIG. 3, the adapter plate 58 has a rear 62 which faces the bracket 44 seen in FIG. 11. The front and rear of the adapter plate are generally rectangular in this example, with each having an area substantially equal to or greater than that of the license plate 42.

As seen in FIG. 2, the adapter plate has a backing portion 57 shaped to receive the license plate 42 seen in FIG. 1 thereon. Referring back to FIG. 2, the backing portion of the adapter plate is generally rectangular in shape in this example. The backing portion 57 of the adapter plate has a top 68, bottom 70 spaced-apart from its top, a first side 72 and a second side 74 which is opposite its first side. The sides of the backing portion 57 of the adapter plate 58 extend between the top and bottom thereof. Referring to FIG. 1, the backing portion of the adapter plate 58 has a peripheral region 64 which aligns with, is outwardly spaced-apart from and extends around the peripheral rim portion 48 of the license plate 42. The backing portion of the adapter plate has a plurality of corners, in this example four corners, which correspond to and align with the corners of the license plate. This is seen in FIG. 1 by corner 66 of adapter plate 58 aligning with corner 54 of the license plate 42.

As seen in FIG. 2, the adapter plate 58 includes a lower peripheral portion, in this example in the form of a display tab 76 coupled to and extending downwards from the bottom 70 of the backing portion 57 of the adapter plate. The display tab is generally rectangular in shape in this example and centrally positioned between sides 72 and 74 of the backing portion of the plate 58. The display tab is configured to receive advertising and the like thereon, as indicated by the indicia "ADVERTISE HERE" indicated by numeral 78 and shown in FIGS. 1 and 2. In other embodiments, the tabs may have different shapes and could be in other positions such as the top of the backing portion 57 of the plate 58 for example.

Referring to FIG. 2, the adapter plate 58 includes a plurality of auxiliary apertures extending therethrough, as shown by aperture 80, positioned between the top 68 and bottom 70 and sides 72 and 74 of the backing portion 57 of the adapter plate. These auxiliary apertures may function to save weight by reducing the amount of metal or other material that may otherwise be needed to form the plate 58.

As seen in FIG. 2, the adapter plate 58 includes a plurality of inner apertures extending therethrough. These include: a first pair of apertures 59 and 61 that are aligned in a first column and positioned adjacent to side 72 of the backing portion 57 of the plate 58; a second pair of apertures 63 and 65 that are aligned in a second column and positioned adjacent to side 74 of the backing portion of the plate 58; a third pair of apertures 67 and 69 that are aligned in a first row and positioned adjacent to top 68 of the backing portion 57 of the adapter plate 58; a fourth pair of apertures 71 and 73 that are aligned in a second row and positioned adjacent to bottom 70 of the backing portion 57 and display tab 76 of plate 58; a fifth pair of apertures 75 and 77 that are aligned in a third row and interposed between the top and bottom of the backing portion of the adapter plate; and a sixth pair of apertures 79 and 81 that are aligned in a fourth row and interposed between apertures 75 and 77 and bottom 70 of the backing portion 57 of the plate 58.

Apertures 67 and 79 align in parallel with side 72 of the backing portion 57 of the plate 58 in this example and apertures 69 and 81 align in parallel with side 74 of the backing portion of the plate in this example. Apertures 67, 69, 79 and 81 are arranged so as to form a first rectangular arrangement in this example. Apertures 59 and 61 align in parallel with side 72 of the backing portion 57 of the plate 58 in this example and apertures 63 and 65 align in parallel with side 74 of the backing portion of the plate in this example. Apertures 59, 61, 63 and 65 are arranged so as to form a second rectangular arrangement in this example.

Apertures 71 and 75 align in parallel with side 72 of the backing portion 57 of the plate 58 in this example and apertures 73 and 77 align in parallel with side 74 of the backing portion of the plate in this example. Apertures 71, 73, 75 and 77 are arranged so as to form a third rectangular arrangement in this example. Each of the inner apertures 59, 61, 63, 65, 67, 69, 71, 73, 75, 77, 79 and 81 is tapered inwardly in a direction extending from the front 60 to the rear 62 of the adapter plate in this example, as seen by apertures 73 and 77 in FIG. 11.

Figure 12:
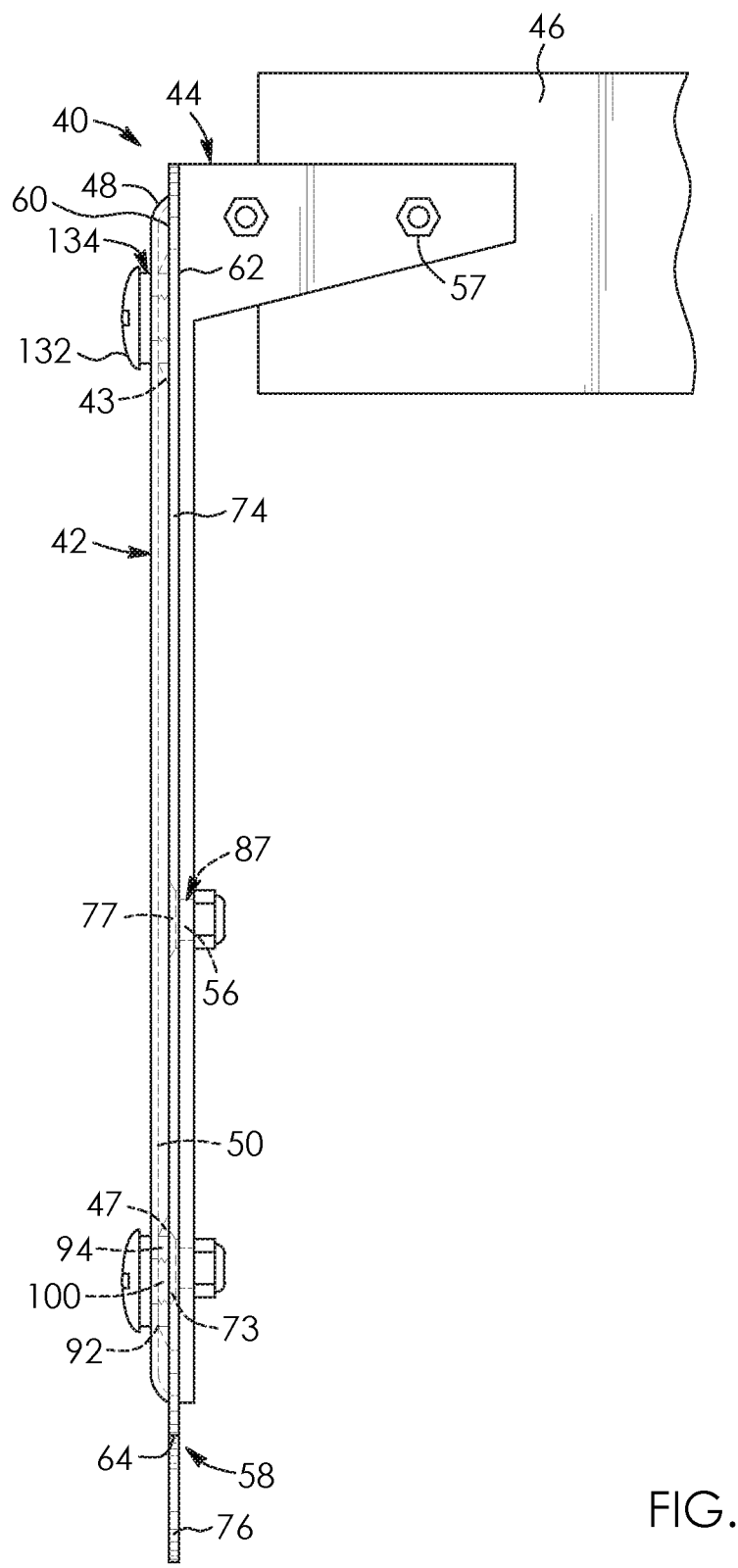
FIG. 12 is a side elevation view of the license plate, adapter plate assembly, bracket and fragmented portion of the vehicle of FIG. 11, the license plate, adapter plate assembly, bracket and fragmented portion being shown coupled together in assembled form.

The inner apertures of the adapter plate 58, as seen by aperture 77 in FIG. 11, are configured to align with respective peripheral apertures of the bracket 44, as seen by peripheral aperture 56 in FIG. 11. The adapter plate 58 is selectively connectable to the bracket via a plurality of fasteners, which in this example are countersunk bolts 87, shown in FIG. 11, which partially extend through apertures 77. The bolts may be secured in place via nuts 89 which may abut the rear 91 of bracket 44 and threadably couple to the threaded ends 83 of the bolts. The use of countersunk bolts and tapered inner apertures 77 ensures that the heads 93 of the bolts 87 are flush with front 60 of plate 58 when the plate is so connected to the bracket as seen in FIG. 12.

Figure 6:
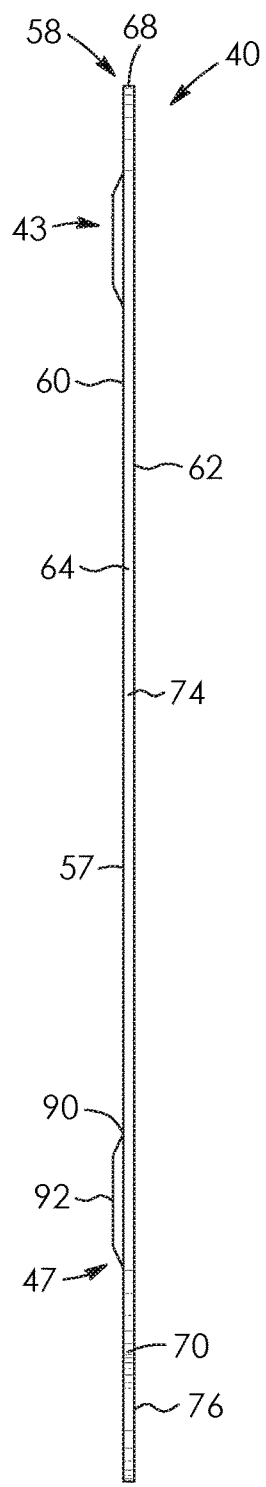
FIG. 6 is a right side view of the adapter plate assembly of FIG. 2, with the left side view being a mirror image thereof.

Referring back to FIG. 2, the adapter plate assembly 40 includes a plurality of spaced-apart protrusions 41, 43, 45 and 47 adjacent to respective ones of the corners of plate 58, as seen by protrusion 47 adjacent to corner 95 of the plate. The protrusions are embossments of the adapter plate in this embodiment and are frustoconical in this example. As seen in FIG. 6, each of the protrusion 47 has a proximal end 90 coupled to, adjacent to and in this example integrally connected to and formed with the front 60 of the plate 58. Each protrusion has a distal end 92 spaced-apart from the proximal end thereof and spaced-apart from the front of the plate.

As seen in FIG. 2, protrusions 41 and 45 align in a first column adjacent to and extending in parallel with side 72 of the backing portion of the plate 58. Protrusions 43 and 47 align in a second column which is spaced-apart from the first column and which is adjacent to and which extends in parallel with side 74 of the backing portion 57 of the adapter plate in this example. Protrusions 41 and 43 align in a first row adjacent to and extending in parallel with top 68 of the backing portion 57 of the adapter plate 58. Protrusions 45 and 47 align in a second row which is spaced-apart from the first row and which is adjacent to and which extends in parallel with bottom 70 of the backing portion 57 of the adapter plate.

The pair of inner apertures 59 and 61 of the adapter plate 58 are interposed between and align with the first column of protrusions 41 and 45 of the adapter plate in this example. The pair of inner apertures 63 and 65 of the adapter plate are interposed between and align with the second column of the protrusions 43 and 47 of the adapter plate in this example. The pair of inner apertures 67 and 69 of the adapter plate 58 are interposed between and align with the first row of protrusions 41 and 43 of the adapter plate in this example. The pair of inner apertures 71 and 73 of the adapter plate are interposed between and align with the second row of protrusions 45 and 47 of the adapter plate in this example.

The inner apertures of the adapter plate 58 may be said to comprise the following four pairs each of which aligns adjacent to a respective one of the protrusions: apertures 59 and 67 aligning diagonal and adjacent to protrusion 41; apertures 63 and 69 aligning diagonal and adjacent to protrusion 43; apertures 61 and 79 aligning diagonal and adjacent to protrusion 45; and apertures 65 and 81 aligning diagonal and adjacent to protrusion 47.

FIGS. 7 to 10 show how the protrusions are formed in the plate 58 according to one preferred embodiment. The adapter plate 58 is first formed in a generally rectangular shape similar in size to that of a license plate as seen in FIG. 2. Next, a plurality of female threaded connectors, in this example self-clinching flush fasteners such as a Pemsert® are selected, as shown by connector 94 seen in FIGS. 7 and 8. Each fastener in this example includes an annular, hexagonal top portion 96, a flanged bottom portion 98 coupled thereto and a threaded aperture 100 extending therethrough from the top portion through to the bottom portion thereof. Pemsert® fasteners are off-the-shelf products which may be purchased at PennEngineering, having an office at 5190 Old Eton Rd., Danboro, Pa. 18916, USA. The connectors are made of steel in this example, though this is not strictly required and they may be made of materials in other embodiments.

Referring to FIG. 9A, plate 58 and respective connectors 94 are next positioned within a press assembly 102. The press assembly includes a pair of platens 104 and 106 between which the plate 58 and connector are pressed together, as shown by movement arrows 108 and 110. During this process, the connectors are aligned so as to correspond to locations of respective apertures 52 of the license plate 42 seen in FIG. 1. The pressing causes the connectors 94 to become embedded within the plate 58 with the top portions 96 of the connectors 94 aligning with the front 60 of the plate and the bottom portions 98 of the connectors aligning with the rear 62 of the plate, as seen in FIG. 9B. In this manner, the adapter plate assembly 40 is provided with a plurality of threaded, outer apertures 100 which align with the outer apertures 52 of the license plate 42 seen in FIG. 1.

Figures 10A, 10B:
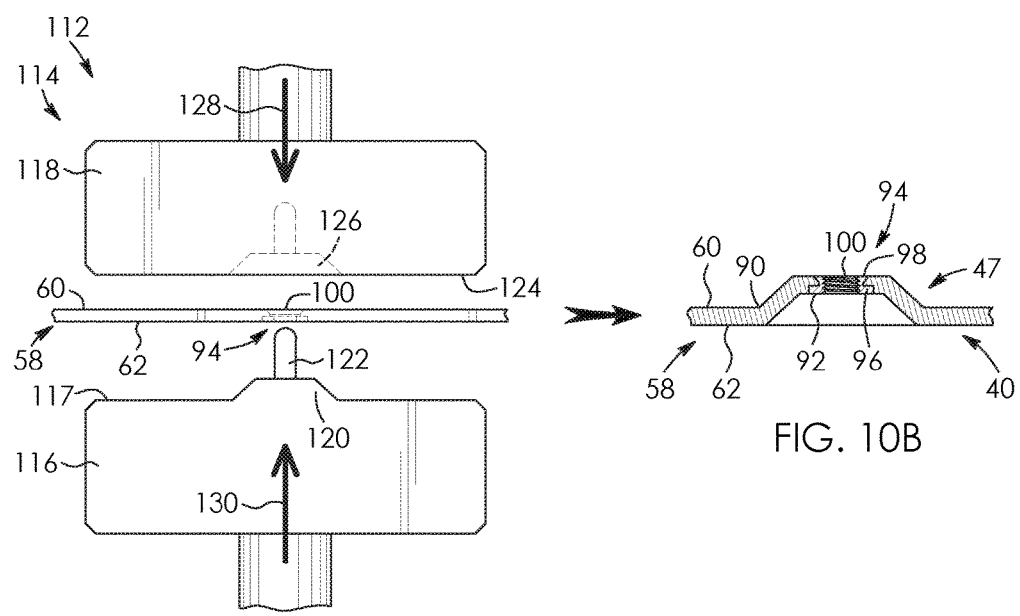
FIG. 10A is an elevation view of the metal sheet so embedded with a connector, the sheet and connector being shown in cross-section, the sheet being positioned between embossment tools for forming a protrusion within the sheet at the location of the connector thereby, the sheet being shown in fragment.
FIG. 10B is a cross-sectional elevation view of the metal sheet of FIG. 10A with the protrusion formed thereafter, the sheet being shown in fragment.

The protrusions 41, 43, 45 and 47 seen in FIG. 2 are next formed by an embossment assembly 112 seen in FIG. 10A in this example. The embossment assembly includes an embossing tool 114 comprising a male member and a corresponding female member, in this example in the form of a pair of tool bits 116 and 118. Tool bit 116 has a substantially planar surface 117 for abutting the rear 62 of the plate 58. The bit has a frustoconical portion 120 extending outwards from planar surface 117 and a centrally-disposed pin 122 extending outwards from the frustoconical portion in this example. The pin is shaped to selectively extend through the outer apertures 100 of plate 58. The extent to which the frustoconical portion 120 of the bit 116 extends outwards corresponds to the desired amount of outward extension of the distal end 92 of the protrusion 47 relative to front 60 of the plate 58 as seen in FIG. 10B.

As seen in FIG. 10A, tool bit 118 has a corresponding substantially planar surface 124 shaped to abut front 60 of the plate 58. The bit further has a recessed portion 126 which is complementary in shape to the frustoconical portion 120 and pin 122 of bit 116 so as to receive them. The pin 122 is aligned with aperture 100, and the bits 116 and 118 are then pressed together, as shown by movement arrows 128 and 130. This causes respective protrusions 47 to be formed in the plate 58, as seen in FIG. 10B.

Referring to FIGS. 11 and 12, the protrusions so formed, as seen by protrusions 43 and 47, are shaped to abut and support the recessed rear 50 of the license plate 42. The protrusions are shaped such that when their distal ends 92 thereof abut the recessed rear of the license plate, the peripheral region 64 of the adapter plate 58 abuts and aligns with the peripheral rim portion 48 of the license plate, as seen in FIGS. 1 and 12.

Referring back to FIG. 11, the adapter plate assembly 40 includes a plurality of fasteners 132 configured to extend through respective apertures 52 of the license plate 42 and outer apertures 100 of the protrusions 47 for coupling to the license plate to the adapter plate in a flush and secure manner. The assembly 40 may further include washers 134 interposed between the fasteners 132 and the front 49 of the license plate 42. FIG. 12 shows the license plate 42 so coupled to the adapter plate 58 and the adapter plate so coupled to bracket 44 of vehicle 46.

Figure 13:
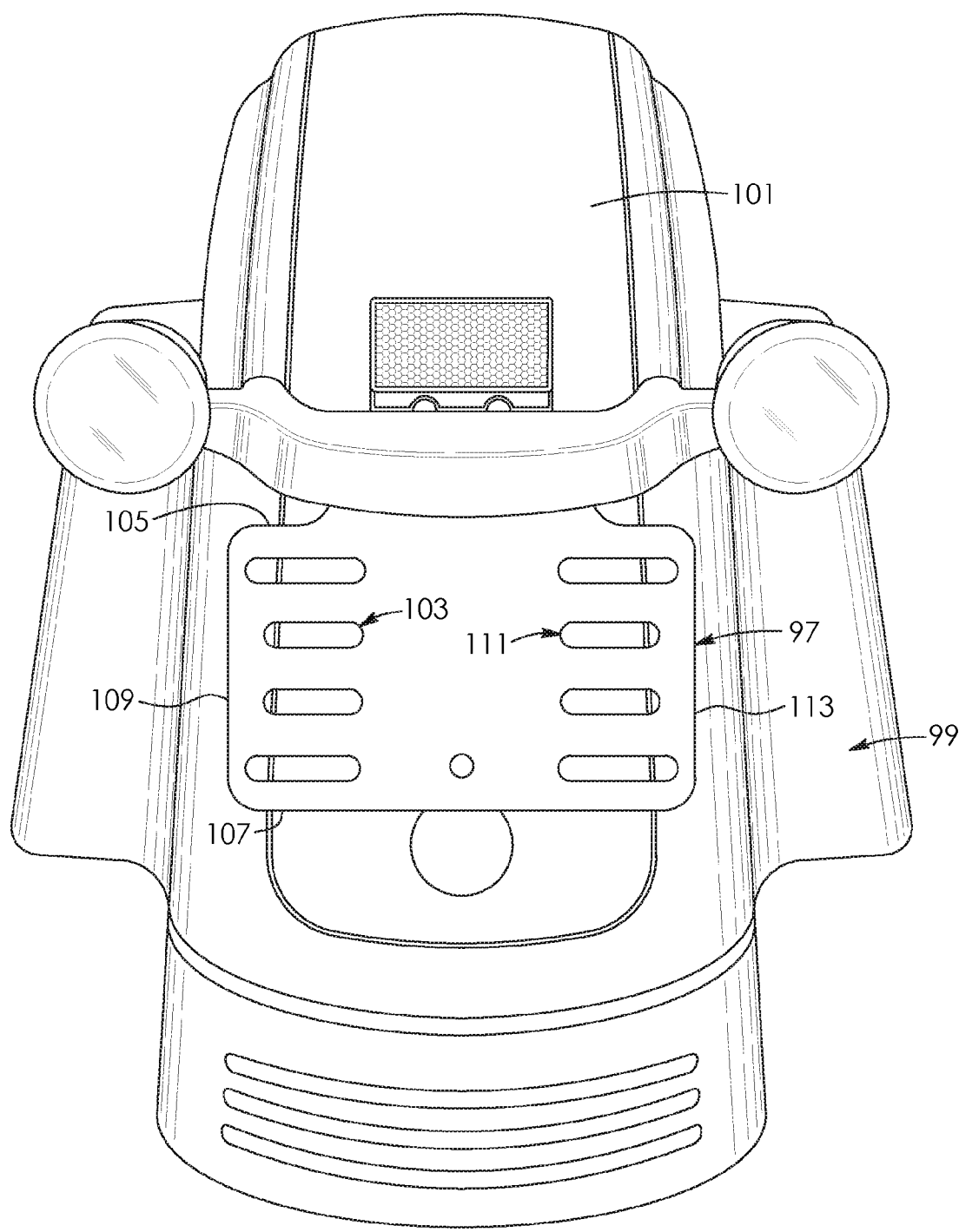
FIG. 13 is front elevation view of a bracket for a rear portion of a vehicle, the bracket being according to a second aspect.

FIG. 13 shows an off-the-shelf bracket 97 according to a second aspect that may be suitable for some American license plates (not shown) to connect thereto. The bracket couples to a rear portion 99 of a motorcycle 101 in this example. The bracket 97 in this case has a first plurality of spaced-apart longitudinally-extending slots, as shown by slot 103, which extend from the top 105 to the bottom 107 of the bracket adjacent to a first side 109 thereof. The bracket has a second plurality of spaced-apart longitudinally-extending slots, as shown by slot 111, which extend from the top 105 to the bottom 107 of the bracket adjacent to a second side 113 thereof. Bracket 97 may be too small for license plates in other jurisdictions, such as various provinces of Canada.

Figure 14:
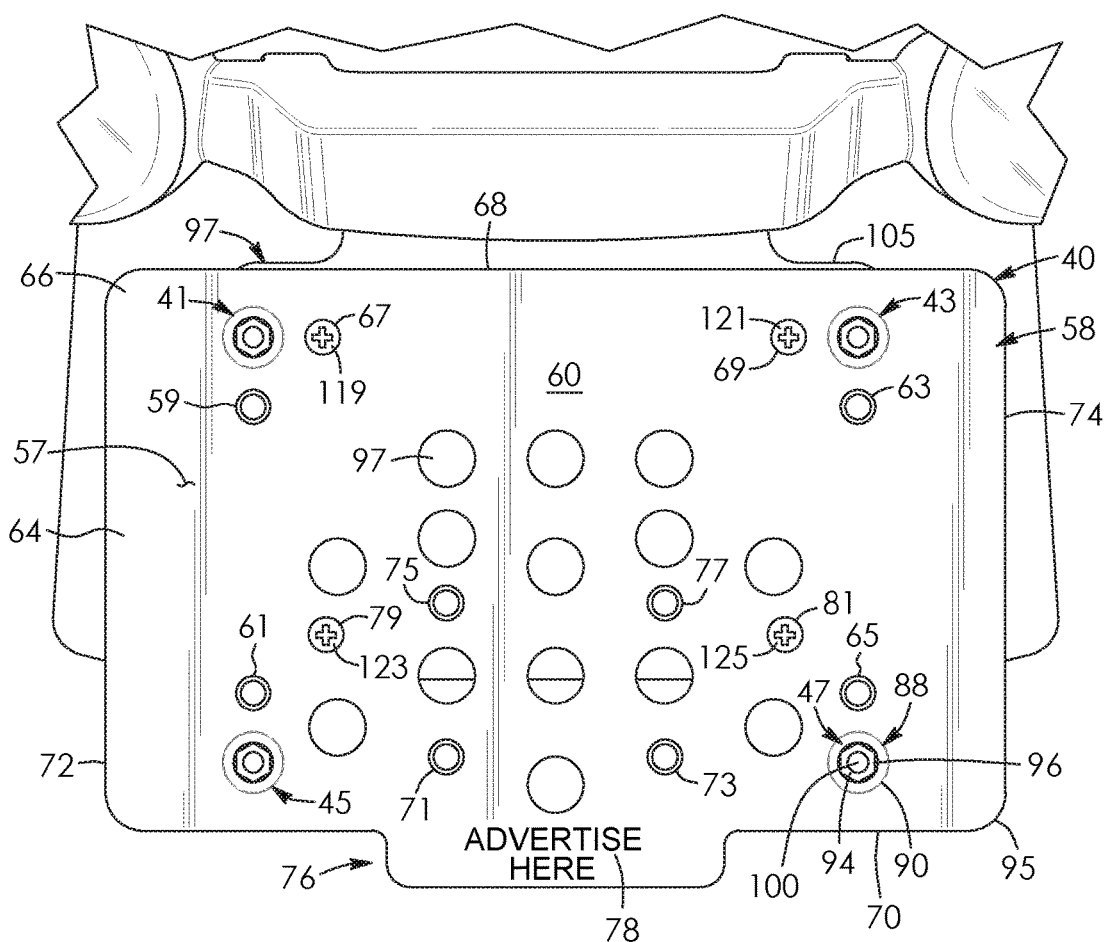
FIG. 14 is a front elevation view of the adapter plate assembly of FIG. 2 coupled to the bracket of FIG. 13, the rear portion of the vehicle being shown in fragment.

As seen in FIG. 14, fasteners 119 and 121 extend through upper apertures 67 and 69, respectively, of plate 58 and upper ones of the plurality of slots 103 and 111 of the bracket seen in FIG. 13, Fasteners 123 and 125 seen in FIG. 14 extend through lower apertures 79 and 81 of the adapter plate and lower ones of the plurality of slots 103 and 111 of the bracket 97 seen in FIG. 13 to couple the adapter plate to the bracket thereby. Thus, the first rectangular arrangement of inner apertures 67, 69, 79 and 81 of the adapter plate 58 are adapted to couple with such slotted, off-the-shelf brackets 97. Referring to FIG. 14, the adapter plate 58 so coupled to the bracket may enable a larger license plate, for example, to be threadably coupled to the adapter plate via protrusions 41, 43, 45 and 47 in a manner otherwise substantially the same as that described for FIGS. 11 and 12.

Figure 15:
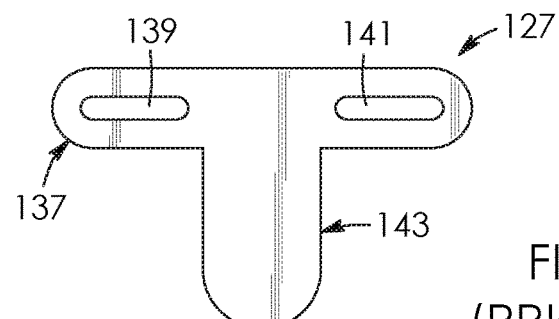
FIG. 15 is a front elevation view of a bracket for a rear portion of a vehicle, the bracket being according to a third aspect.

FIG. 15 shows an off-the-shelf bracket 127 according to a third aspect suitable for some American license plates (not shown) to connect thereto. The bracket is T-shaped in this example. The bracket 127 couples to a rear portion 99 of motorcycle 101 seen in FIG. 16 in this example. Referring to FIG. 15, the bracket 127 in this example has a horizontally-extending upper portion 137. The bracket has a pair of spaced-apart, longitudinally-extending slots 139 and 141 which extend through the upper portion thereof. The bracket 127 has a centrally-disposed vertically-extending portion 143 integrally connected to, formed with and extending downwards from upper portion 137 thereof. Likewise, bracket 127 may be too small for license plates in other jurisdictions, such as various provinces of Canada, and/or may inadequately support the license plate, leading to bending of the corners of the license plate.

Figure 16:
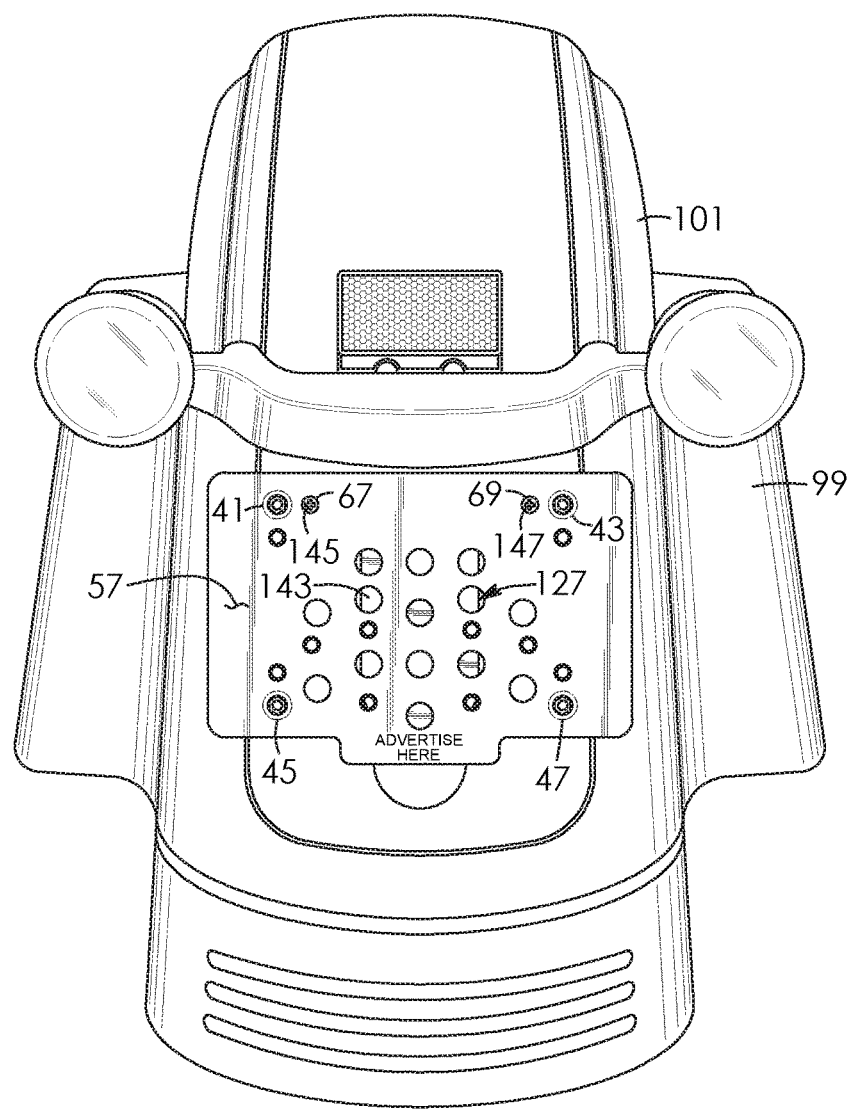
FIG. 16 is a front elevation view of the adapter plate assembly of FIG. 2 coupled to the bracket of FIG. 15.

Referring to FIG. 16, fasteners 145 and 147 extend through respective ones of the upper apertures 67 and 69 of the adapter plate 58 and respective ones of the slots 139 and 141 of the bracket 127 seen in FIG. 15 to couple the adapter plate 58 to bracket 127 thereby. In this manner, the adapter plate so coupled to the bracket may thus enable a license plate to be threadably connected to the adapter plate via protrusions 41, 43, 45 and 47 in a manner which may better support the license plate and as otherwise substantially the same as that described for FIGS. 11 and 12.

Figures 17A, 17B:
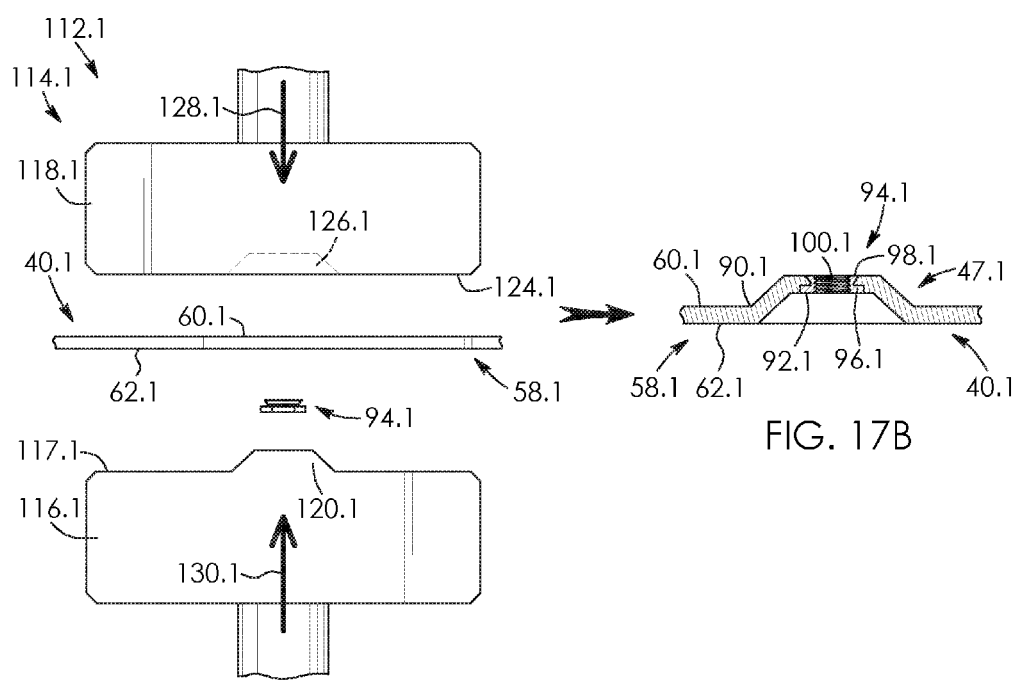
FIG. 17A is an elevation view of a metal sheet and the connector of FIG. 7 positioned within a press assembly according to a further aspect for embedding the connector within the sheet.
FIG. 17B is a cross-sectional elevation view of the sheet of FIG. 17A, with the connector embedded within the sheet and being shown partially in cross-section.

FIGS. 17A and 17B show a process for forming the adapter plate of FIGS. 1 to 16 according to a second aspect. Like parts have like numbers and functions as the adapter plate assembly 40 and process shown in FIGS. 1 to 16 with the addition of decimal extension ".1". Adapter plate assembly 40.1 is formed in a substantially similar manner to that shown in FIGS. 9A to 10B with the following exceptions. In this example, connectors 94.1 are pressed between bits 116.1 and 118.1 and a metal sheet so as to embed the connectors within plate 58.1 while also forming protrusions 47.1 within the same step. The process shown in FIGS. 17A and 17B may thus function to reduce the amount of steps required to produce adapter plate 58.1.

FIGS. 18 to 23 show an adapter plate assembly 40.2 according to a second aspect. Like parts have like numbers and functions as the adapter plate assembly 40 shown in FIGS. 1 to 16 with the addition of decimal extension ".2". Adapter plate assembly 40.2 is substantially the same as adapter plate assembly 40 shown in FIGS. 1 to 16 with the following exceptions.

Figure 23:
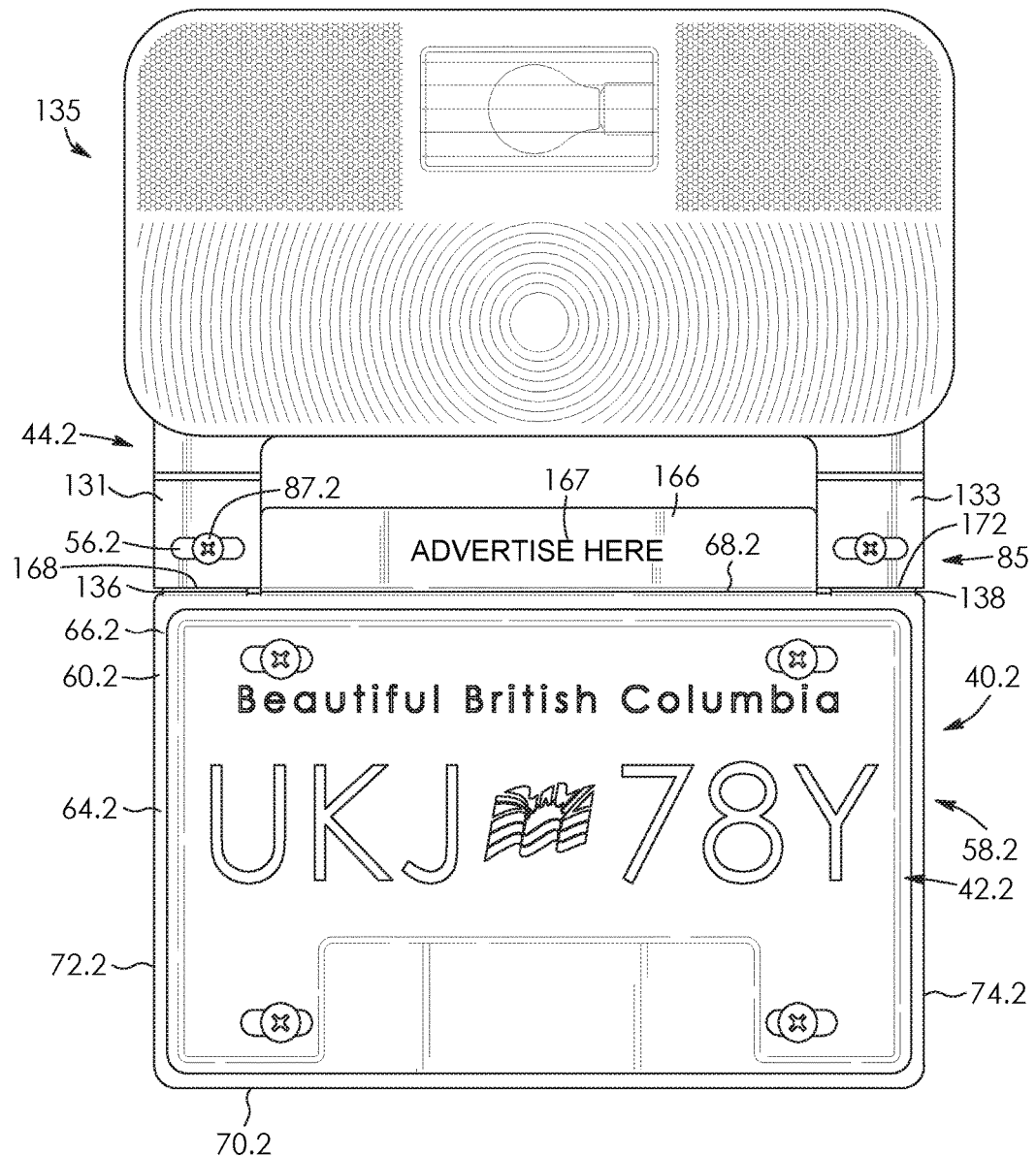
FIG. 23 is a front elevation view of the adapter plate assembly of FIG. 18, a license plate connected thereto, and a light assembly for a vehicle, the adapter plate assembly having a pair of spaced-apart connector tabs and the light assembly being shown coupled to the connector tabs thereof.
Figure 24:
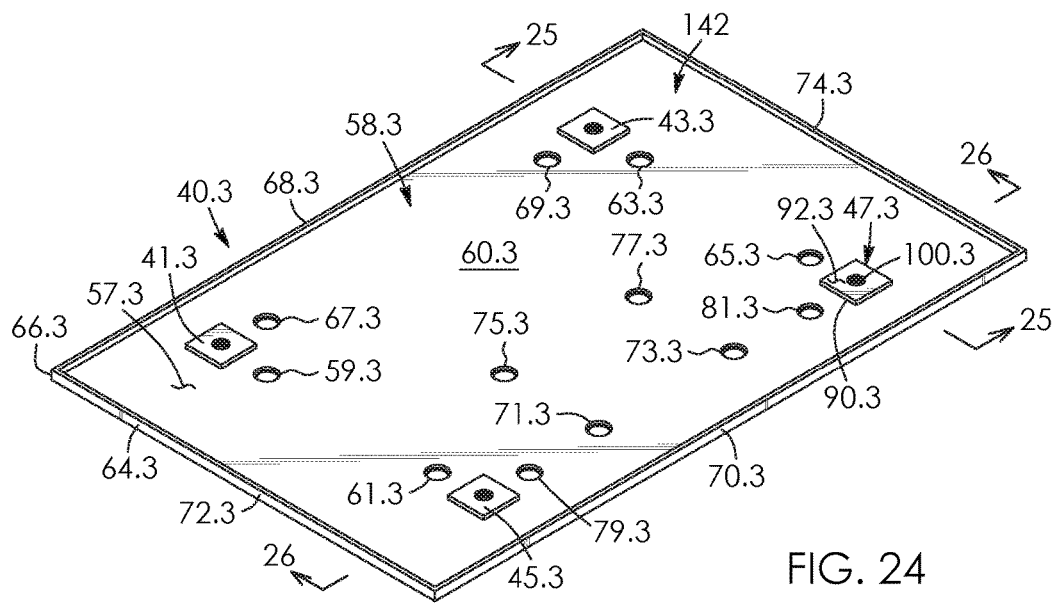
FIG. 24 is a perspective view of an adapter plate assembly according to a third aspect.
Figure 25:
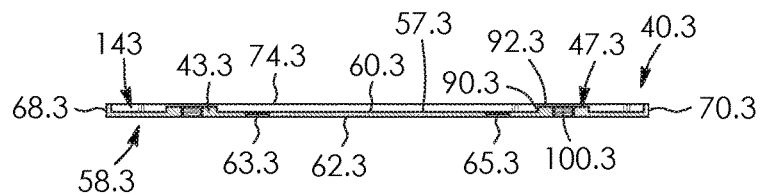
FIG. 25 is a cross-sectional view of the adapter plate assembly of FIG. 24 taken along lines 25-25 thereof.
Figure 26:
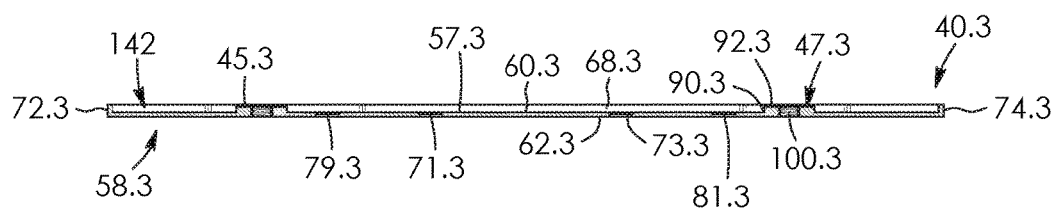
FIG. 26 is a cross-sectional view of the adapter plate assembly of FIG. 24 taken along lines 26-26 thereof.
Figure 27:
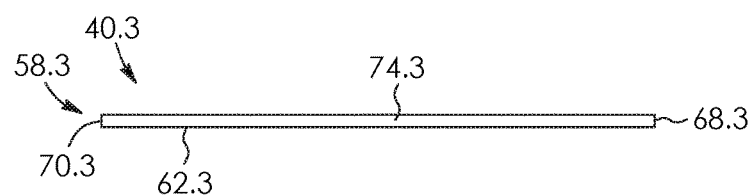
FIG. 27 is a right side view of the adapter plate assembly of FIG. 24, with the left side being a mirror image thereof.
Figure 28:
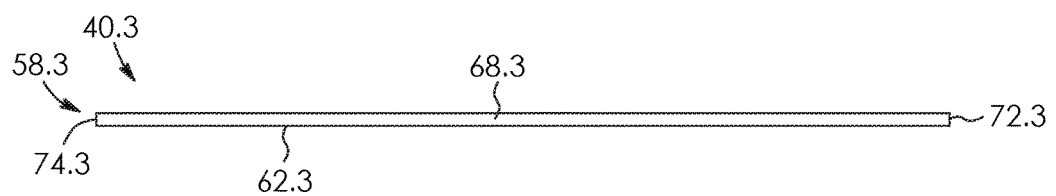
FIG. 28 is a top plan view of the adapter assembly of FIG. 24, with the bottom plan view being a mirror image thereof.

As seen in FIG. 23, bracket 44.2 comprises two spaced-apart lower portions 131 and 133 which are part of a light assembly 135 of the vehicle, in this example a trailer. Light assemblies for trailers, including their various parts and functionings, are known per se and therefore will not be described in detail. Each of the lower portions of the bracket 44.2 has a horizontally-extending slotted aperture in this example extending therethrough, as shown by aperture 56.2 extending through lower portion 131 of the bracket.

Figure 18:
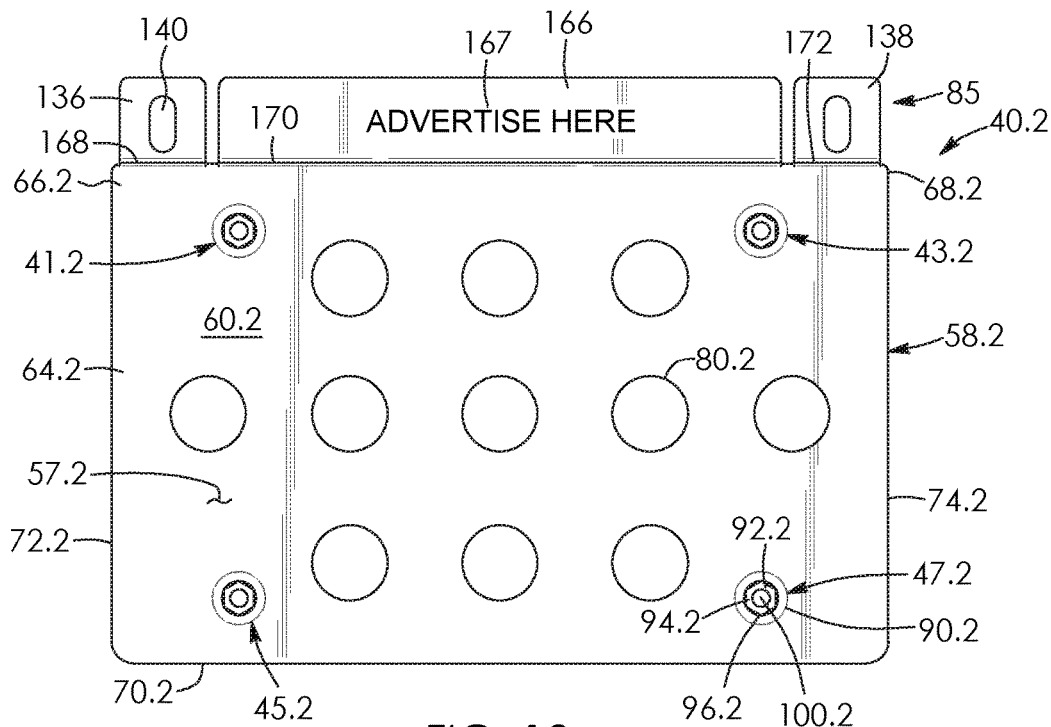
FIG. 18 is a front elevation view of an adapter plate assembly according to a second aspect.
Figure 19:
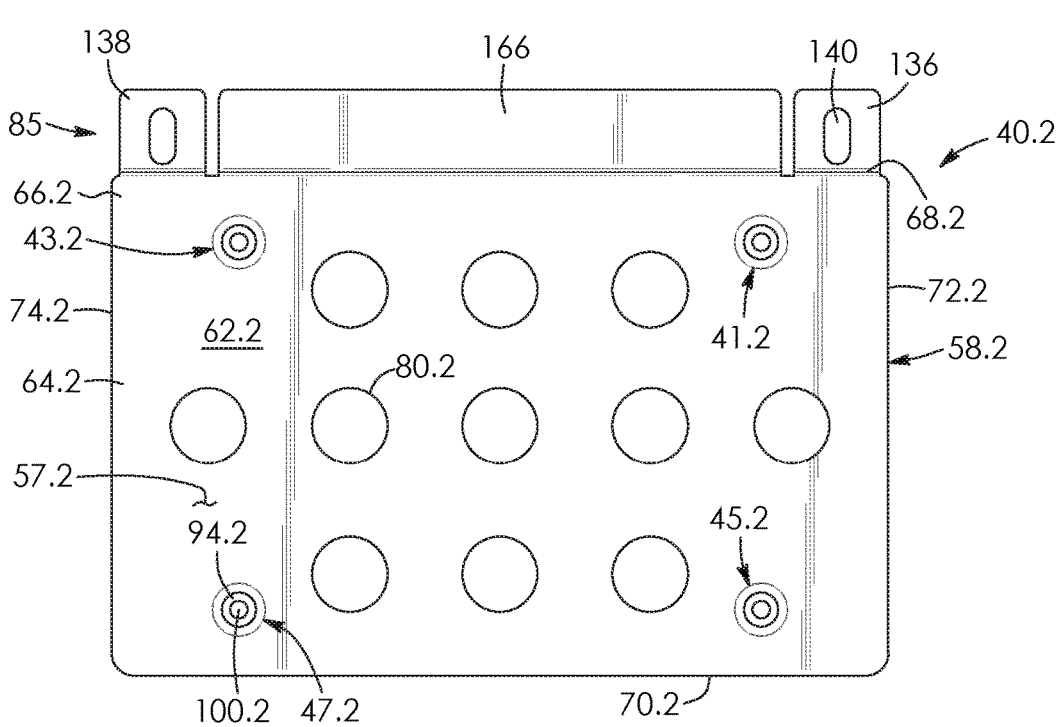
FIG. 19 is a rear elevation view thereof.
Figure 20:
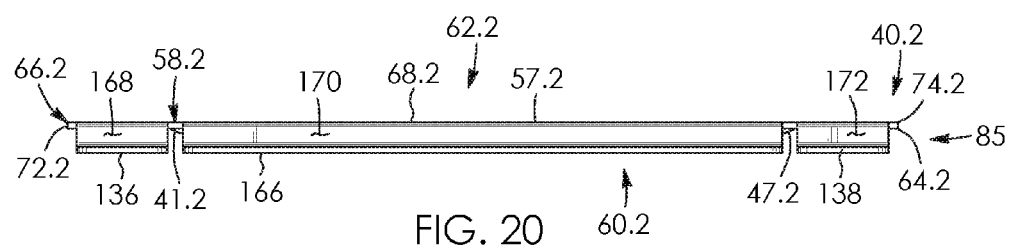
FIG. 20 is a top plan view thereof.
Figure 21:
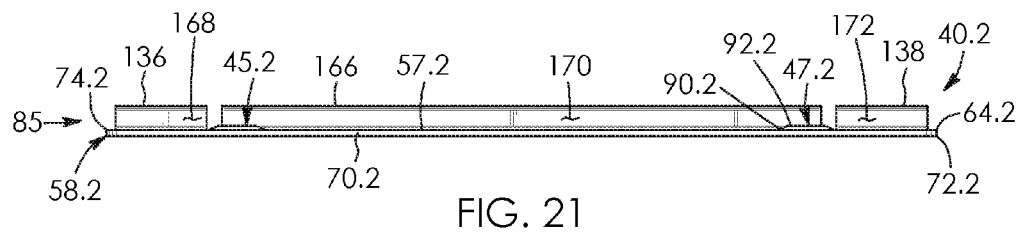
FIG. 21 is bottom plan view thereof.

As seen in FIG. 18, the adapter plate 58.2 has an upper peripheral portion 85 which couples to and extends upwards from the top 68.2 of the backing portion 57.2 of the adapter plate 58.2. The upper peripheral portion of the adapter plate extends between the sides 72.2 and 74.2 of the backing portion 57.2 of the adapter plate in this example. The upper peripheral portion 85 of the adapter plate includes a plurality of tabs, in this example in the form of a pair of spaced-apart connector tabs 136 and 138 and a display tab 166 extending between the connector tabs. Display tab is generally rectangular in shape and includes advertising indicia 167 thereon. As seen in FIG. 23, display tab 166 extends between connector tabs 136 and 138 and portions 131 and 133 of bracket 44.2 in this example. Referring back to FIG. 18, each of the connector tabs 136 and 138 is likewise rectangular in profile in this example. As seen in FIG. 20, the tabs 136, 138 and 166 are forwardly offset at least in part towards the front 60.2 of the adapter plate 58.2 relative to the backing portion 57.2 of the adapter plate 58.2.

Figure 22:
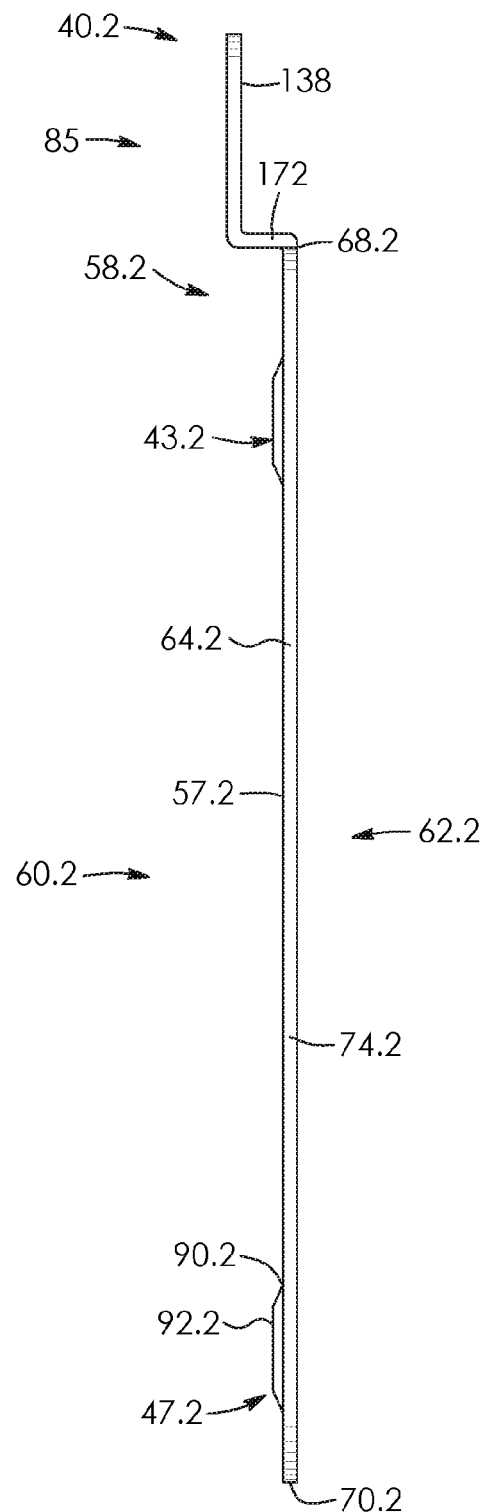
FIG. 22 is a right side view of the adapter plate assembly of FIG. 18, with the left side view being a mirror image thereof.

As seen in FIG. 20, the upper peripheral portion 85 of the adapter plate 58.2 includes a plurality of upper flanges 168, 170 and 172 that align adjacent to the top 68.2 of the backing portion 57.2 of the adapter plate. The flanges extend perpendicularly from backing portion 57.2 of the adapter plate towards the front 60.2 of the adapter plate in this example. The flanges couple to and extend between the backing portion 57.2 of the adapter plate and the tabs of the upper peripheral portion of the adapter plate. This is seen in FIG. 22 by flange 172 extending between top 68.2 of backing portion 57.2 of the adapter plate 58.2 and connector tab 138.

Referring to FIG. 18, each connector tab has a peripheral aperture, in this example a vertically-extending slotted aperture extending therethrough, as seen by aperture 140 for tab 136. The apertures 140 align with respective peripheral apertures 56.2 of the portions 131 and 133 of bracket 44.2. The adapter plate assembly 40.2 couples to the bracket via fasteners 87.2 which selectively extend through these apertures.

As seen in FIG. 23, connector tabs 136 and 138 and flanges 168 and 172 of the upper peripheral portion 85 of the adapter plate 58.2. form seats. Referring to FIG. 18, the upper peripheral portion 85 of the adapter plate 58.2 is L-shaped in cross-section in this example and enables the tabs 136 and 138 to be angled relative to the front 60.2 of the license plate 42.2 seen in FIG. 23. The connector tabs are configured to be selectively bendable so as to permit adjustment of the positioning of the front of the adapter plate 58.2 relative to the bracket 44.2.

FIGS. 24 to 31 show an adapter plate assembly 40.3 according to a third aspect. Like parts have like numbers and functions as the adapter plate assembly 40 shown in FIGS. 1 to 12 with the addition of decimal extension ".3". Adapter plate assembly 40.3 is substantially the same as adapter plate assembly 40 shown in FIGS. 1 to 12 with the following exceptions.

Each of the protrusions 41.3, 43.3, 45.3 and 47.3 is in the shape of a rectangular prism in this example.

Figure 31:
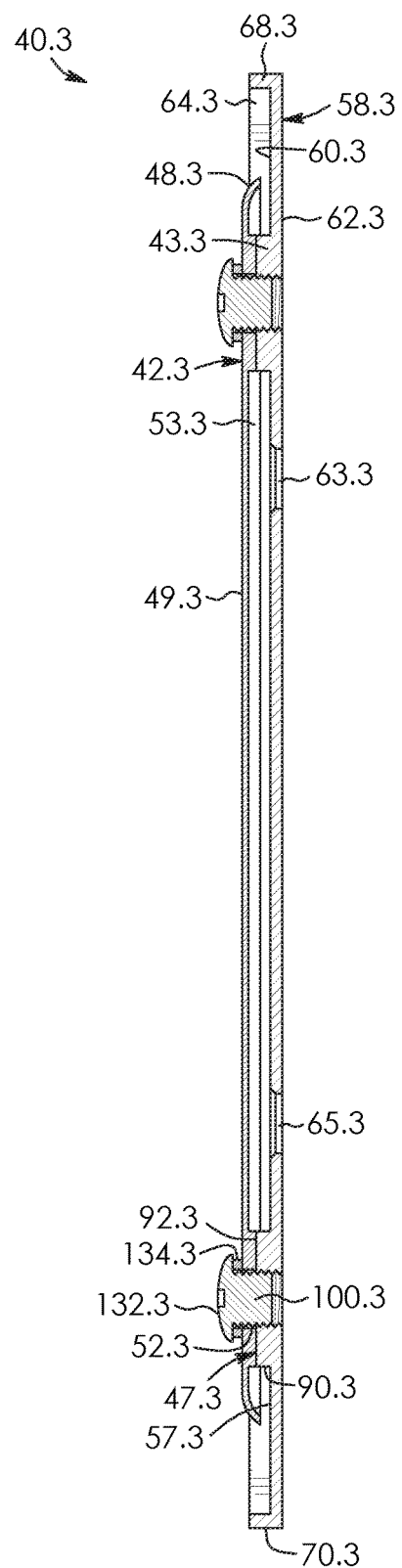
FIG. 31 is a side elevation, cross-sectional view of the adapter plate assembly of FIG. 24, together with a license plate connected thereto.

The adapter plate 58.3 has a recessed portion 142 which receives the license plate 42.3, as seen in FIG. 31. The recessed portion is defined by top 68.3, bottom 70.3, and sides 72.3 and 74.3 of the backing portion 57.3 of the adapter plate, each of which extends upwards from front 60.3 of the plate. The recessed portion 142 is sized to receive the license plate therewithin, as seen in FIG. 31. The peripheral region 64.3 of the adapter plate is thus coupled to and extends outwards from the front of the plate. The peripheral rim portion is shaped to extend around and partially enclose the license plate 42.3, as seen in FIG. 31.

The adapter plate 58.3, with its protrusions, in this example may be formed by milling out a recessed portion of the metal sheet.

Figure 29:
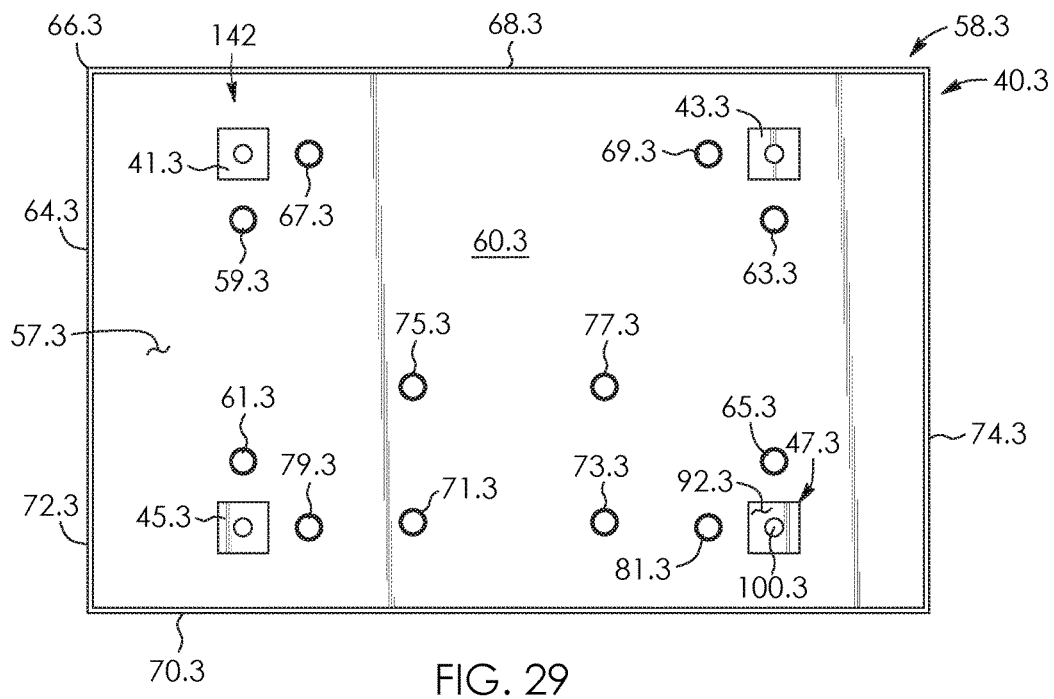
FIG. 29 is a front elevation view of the adapter plate assembly of FIG. 24.
Figure 30:
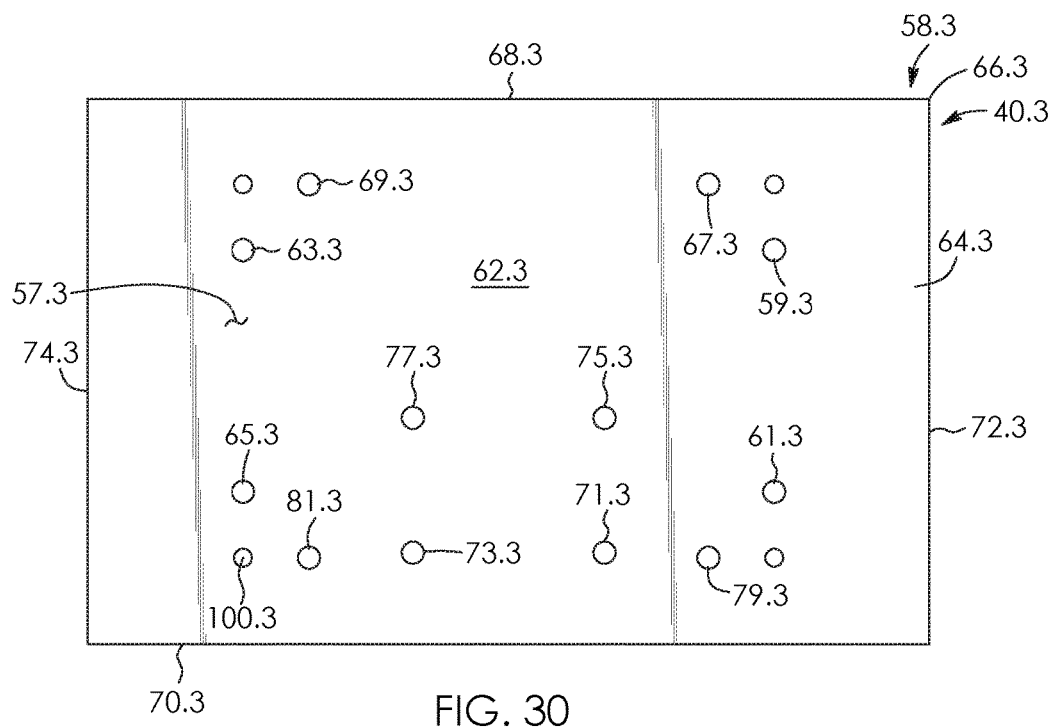
FIG. 30 is a rear elevation view thereof.

In this embodiment, apertures 71.3 and 73.3 substantially align with apertures 79.3 and 81.3, protrusions 45.3 and 47.3, and bottom 70.3 of the backing portion 57.3 of the plate 58.3, as seen in FIG. 29.

FIGS. 32 and 33 show an adapter plate assembly 40.4 according to a fourth aspect. Like parts have like numbers and functions as the adapter plate assembly 40.2 shown in FIGS. 18 to 23 with decimal extension ".4" replacing decimal extension ".2" and being added for like parts not previously having a decimal extension. Adapter plate assembly 40.4 is substantially the same as adapter plate assembly 40.2 shown in FIGS. 18 to 23 with the following exceptions.

Referring to FIG. 32, the assembly 40.4 may be particularly adapted for vehicles in the form of semi-trailers 46.4. However, this is not strictly required and assembly 40.4 may be used for other types of vehicles as well.

As seen in FIG. 32, the upper peripheral portion of the adapter plate 58.4 is in this example a seat 85.4 formed by tab 166.4 and flange 170.4. The seat in this example is adjacent to the top 68.4 of the backing portion 57.4 of the adapter plate. As seen in FIG. 33, the seat 85.4 is L-shaped in cross-section in this example.

Assembly 40.4 further includes a resilient member 144. The resilient member is elastomeric in this example and in this case made of rubber. The resilient member 144 is substantially a rectangular prism in shape in this example. The resilient member has a first or lower portion 174 received by and coupled to the seat 85.4 of the adapter plate 58.4 as seen in FIG. 33. Still referring to FIG. 33, the lower portion of the resilient member 144 has a planar front 176 and a planar rear 178 opposite the planar front. The planar front of the lower portion 174 of the resilient member abuts, aligns with, and covers tab 166.4 in this example. As seen in FIG. 33, the resilient member 144 abuts the upper flange 170.4 of the seat 85.5 of the adapter plate 58.4 and couples to the adapter plate adjacent to said upper flange in this example.

The resilient member has a pair of spaced-apart outer apertures 146 and 148 extending through the lower portion 174 thereof. The apertures extend through the lower portion of the resilient member 144 from the front 176 to the rear 178 thereof seen in FIG. 33. The outer apertures are positioned adjacent to respective ones of the sides 153 and 155 of the resilient member 144. The outer apertures 146 and 148 of the lower portion 174 of the resilient member 144 align with the peripheral apertures 140.4 and 180 of the adapter plate 58.4. As seen in FIG. 33, license plate 42.4 couples to adapter plate 58.4 in a like manner as previously described.

As seen in FIG. 32, the resilient member 144 has a second or upper portion 182 which in this example is integrally formed and coupled to the lower portion 174 thereof. The lower and upper portions of the resilient member are generally rectangular in this example. The upper portion 182 of the resilient member 144 is connectable to a connector portion, in this example bracket 44.4 of trailer 46.4 as seen in FIG. 33, The upper portion of the resilient member extends upwards from the seat 85.4 of the adapter plate 58.4.

The resilient member 144 has a second pair of spaced-apart inner apertures 157 and 159 extending through the upper portion thereof. Apertures 157 and 159 which are inwardly spaced from sides 153 and 155 thereof, respectively. The inner apertures of the upper portion 182 of the resilient member are also inwardly spaced from outer apertures 146 and 148 of the lower portion 174 of the resilient member 144. The inner apertures 157 and 159 of the upper portion 182 of the resilient member are positioned to align with peripheral apertures 56.4 and 184 of bracket 44.4 seen in FIG. 32.

As seen in FIG. 32, the assembly includes a plurality of connectors, in this example rivets, in this case crush rivets 149 and 151; however, this is not strictly required and other connectors may be used in other embodiments. Rivet 149 extends through aperture 140.4 of tab 166.4 and aperture 146 of the lower portion 174 of the resilient member 144. Rivet 151 extends through aperture 180 of the tab and aperture 148 of the lower portion of the resilient member.

The rivets are crushed thereafter to couple the adapter plate 58.4 and lower portion of the resilient member together thereby.

Referring to FIG. 32, the assembly includes a further plurality of connectors, in this example bolts 87.4 and 186 and corresponding nuts threadably connectable thereto. This is seen by nut 161 in FIG. 33 coupled to bolt 186. A corresponding washer 163 is interposed between its respective nut 161 and the bracket 44.4 in this example. However, this form of connectors and coupling is not strictly required and other connectors may be used in other embodiments.

As seen in FIG. 32, bolt 87.4 extends through aperture 157 of the upper portion 182 of the resilient member 144 and aperture 56.4 of the bracket 44.4 of the trailer 46.4. Bolt 186 extends through aperture 159 of the upper portion of the resilient member and aperture 184 of the bracket of the trailer. As seen in FIG. 33, nuts 161 couple with to the threaded ends 188 of the bolts 186 thereafter. The nuts abut washers 163 in this example which in turn abut the rear 165 of bracket 44.4 for coupling the resilient member 144, and thus adapter plate 58.4 and license plate 42.2, to the bracket 44.4 thereby. As seen in FIG. 33, the resilient member is thus interposed between the display tab 166.4 of the adapter plate 58.4 and the bracket 44.4 of the trailer 46.4 in this example. The backing portion 57.4 of the adapter plate is shaped to align with the vertically-extending portion 190 of bracket of the vehicle in this embodiment. The resilient member 144 so configured may enable the license plate 42.4 seen in FIG. 33 to flex and selectively move slightly forward and rearward.

FIGS. 34 and 35 show an adapter plate assembly 40.5 according to a fifth aspect. Like parts have like numbers and functions as the adapter plate assembly 40.4 shown in FIGS. 32 and 33 with decimal extension ".5" replacing decimal extension ".4" and being added for like parts not previously having a decimal extension. Adapter plate assembly 40.5 is substantially the same as adapter plate assembly 40.4 shown in FIGS. 32 and 33 with the following exceptions.

As seen in FIG. 34, the seat 85.5 of the adapter plate 58.5 includes a central aperture 192 extending therethrough. Aperture 192 is positioned between apertures 140.5 and 180.5 in this example. Each of the apertures 140.5, 180.5 and 192 is square in shape in this example. The apertures are shaped to receive a plurality of connectors which in this example in the form of carriage bolts 149.5, 151.5 and 194; however, this is not strictly required and other types of connectors may be used in other examples.

The lower portion 174.5 of the resilient member 144.5 includes an additional central aperture 196 extending therethrough. Aperture 196 is positioned between apertures 146.5 and 148.5 in this example and aligns with aperture 192 of the seat 85.5 of the adapter plate 85.5.

The upper portion 182.5 of the resilient member 144.5 is inwardly spaced relative to the lower portion 174.5 of the resilient member in this example. The resilient member has spaced-apart planar regions 198 and 200 adjacent to sides 153.5 and 155.5 thereof. The planar regions are L-shaped in front and rear profile in this example, with each comprising parts of the lower and upper portions of the resilient member. Apertures 146.5 and 157.5 extend through planar region 198 and apertures 148.5 and 159.5 extend through planar region 200 in this example. The upper portion 182.5 of the resilient member 144.5 is U-shaped in front and rear profile in this example with an upper recessed region 202 between the planar regions 198 and 200 of the resilient member.

Assembly 40.5 includes an elongate backing member, in this example a backing plate 204. However, this is not strictly required, and the backing member may be other shapes in other examples. The backing plate 204 is made of metal sheet and is substantially rectangular in shape in this example. Likewise, this is not strictly required and the backing plate may be made of non-metal materials in other examples. The backing plate 204 is shaped to substantially align with and cover the second side 178.5 of the lower portion 174.5 of the resilient member 144.5 seen in FIG. 35 in this example. As seen in FIG. 35, the seat 85.5 of the adapter plate 58.5 and the backing plate 204 are shaped to thus form a receptacle within which the lower portion 174.5 of the resilient member 144.5 is received.

The backing plate 204 has a plurality of spaced-apart apertures extending therethrough, in this example in the form of apertures 206, 208 and 210. Apertures 206, 208, and 210 of the back plate align with apertures 140.5, 192, and 180.5, respectively, of the seat 85.5 of the adapter plate 58.5 and align with apertures 146.5, 196, and 148.5 of the resilient member 144.5, respectively. In this manner, bolts 149.5, 194, and 151.5 may extend therethrough and couple the adapter plate 58.5, resilient member 144.5 and backing plate 204 together via nuts as shown by nut 193 in FIG. 35 for bolt 151.5. As seen in FIG. 35, the backing plate so coupled together aligns and extends substantially in parallel with the backing portion 57.5 of the adapter plate in this example.

FIGS. 36 and 37 show an adapter plate assembly 40.6 according to a sixth aspect. Like parts have like numbers and functions as the adapter plate assembly 40.5 shown in FIGS. 34 and 35 with decimal extension ".6" replacing decimal extension ".5" and being added for like parts not previously having a decimal extension. Adapter plate assembly 40.6 is substantially the same as adapter plate assembly 40.4 shown in FIGS. 34 and 35 with the following exceptions.

In this example, adapter plate 58.6 terminates at the top 68.6 of the backing portion 57.6 thereof and has no upper peripheral portion coupling to and extending from said backing portion. Apertures 140.6, 192.6 and 180.6 extend through the backing portion 57.6 of the adapter plate. The front 176.6 of the lower portion 174.6 of the resilient member 144.6 couples directly to the backing portion of the adapter plate 58.6 at the rear 62.6 of the adapter plate as seen in FIG. 37, A seat such as seat 85.5 shown in FIG. 34 for assembly 40.5 is thus not provided nor required for assembly 40.6 shown in FIGS. 36 and 37.

The adapter plate 58.6 includes a lower peripheral portion in this example in the form of a lower flange 76.6. The lower flange couples to and extends outwards from the bottom 70.6 of the backing portion 57.6 of the adapter plate in the direction of the front 60.6 of the adapter plate. The flange 76.6 extends between sides 72.6 and 74.6 of the backing portion 57.6 of the adapter plate 58.6. The flange is generally rectangular in shape in this example and is positioned substantially perpendicular to the backing portion 57.6 of the adapter plate 58.6 in this example.

Figures 38, 39:
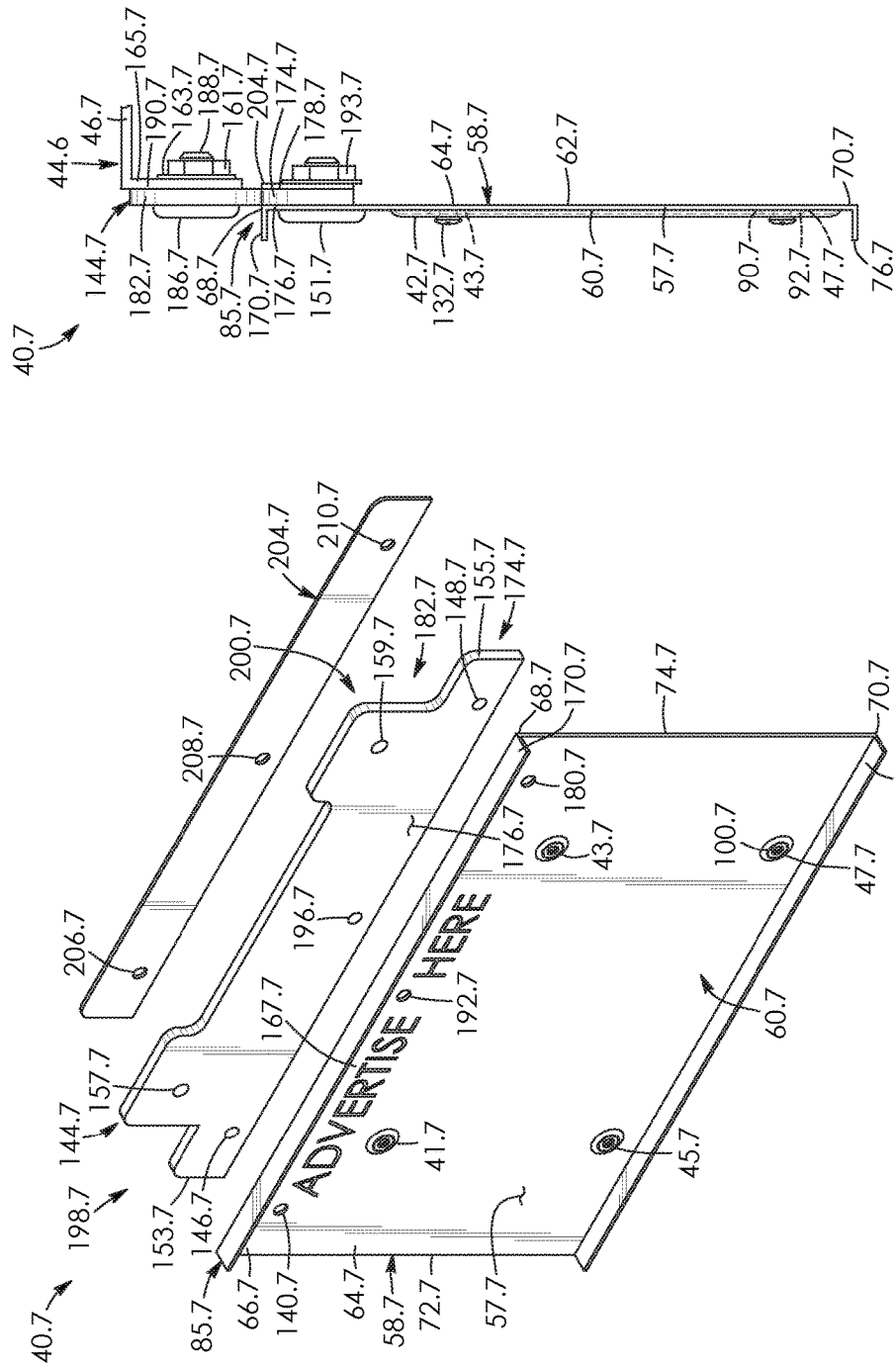
FIG. 38 is an exploded rear, top perspective of an adapter plate assembly according to a seventh aspect, and a bracket for a rear portion of a trailer, the bracket being similar to that shown in FIG. 32 and the trailer being shown in fragment.
FIG. 39 is a right side elevation view of the adapter plate assembly coupled to a license plate and the bracket of the trailer shown in FIG. 38.

FIGS. 38 and 39 show an adapter plate assembly 40.7 according to a seventh aspect. Like parts have like numbers and functions as the adapter plate assembly 40.6 shown in FIGS. 36 and 37 with decimal extension ".7" replacing decimal extension ".6" and being added for like parts not previously having a decimal extension. Adapter plate assembly 40.7 is substantially the same as adapter plate assembly 40.4 shown in FIGS. 34 and 35 with the following exceptions.

The adapter plate 58.7 includes an upper peripheral portion 85.7 which in this example comprises only upper flange 170.7. The upper flange couples to and extends outwards from the top 68.7 of the backing portion 57.7 of the adapter plate in the direction of the front 60.7 of the adapter plate in this example. Flange 170.7 extends between sides 72.7 and 74.7 of the backing portion of the adapter plate in this example. The flange is generally rectangular in shape in this example and is positioned substantially perpendicular to the backing portion 57.6 of the adapter plate 58.6 in this example. As seen in FIG. 38, flange 170.7 is positioned between the lower portion 174.7 and the upper portion 182.7 of the resilient member 144.7 in this example.

Referring to FIG. 38, license plate 42.7 so coupled to the backing portion 57.7 of the adapter plate 58.7 is between flanges 76.7 and 170.7 in this example.

FIGS. 40 and 41 show an adapter plate assembly 40.8 according to an eighth aspect. Like parts have like numbers and functions as the adapter plate assembly 40.5 shown in FIGS. 34 and 35 with decimal extension ".8" replacing decimal extension ".5" and being added for like parts not previously having a decimal extension. Adapter plate assembly 40.8 is substantially the same as adapter plate assembly 40.5 shown in FIGS. 34 and 35 with the following exceptions.

Adapter plate 58.8 includes an upper peripheral portion in the form of a receptacle 85.8. The receptacle is U-shaped in cross-section in this example. The receptacle comprises a pair of spaced-apart planar members, in this example in the form of display tab 166.8 and backing plate 204.8, and flange 170.8 coupling the tab and backing plate together. The display tab and backing plate extend in parallel with each other in this example. The backing plate 204.8 is thus integrally connected to and formed with the flange 170.8 and tab 166.8 in this embodiment.

Display tab 166.8 is coupled to, is integrally formed with, extends upwards from and extends along the top 68.8 of the backing portion 57.8 of the adapter plate 58.8 in this example. In this example, the display tab aligns with and extends in parallel with the backing portion 57.8 of the adapter plate 58.8. As seen in FIG. 40, flange 170.8 in this example extends outwards from the backing portion 57.8 of the adapter plate 58.8 towards the rear 62.8 of the adapter plate.

The lower portion 174.8 of the resilient member 144.8 is received within and couples to the receptacle 85.8 via connectors, in this example bolts 151.8 and corresponding nuts 193.8.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. An adapter plate assembly for mounting a license plate to a vehicle, the assembly comprising:
   an adapter plate to which the license plate is connectable, the adapter plate including a backing portion shaped to receive and support the license plate, and the adapter plate including an upper peripheral portion; and
   a resilient member having a lower portion connectable with the upper peripheral portion of the adapter plate and an upper portion connectable to the vehicle, the resilient member being configured to enable the license plate to move slightly forward and rearward;
   wherein the adapter plate includes a receptacle at the upper peripheral portion thereof, the receptacle being U-shaped in cross-section for receiving the resilient portion.

2. The assembly as claimed in claim 1, further including an elongate backing member, the lower portion of the resilient member being connectable with and interposable between the backing member and the adapter plate.

3. The assembly as claimed in claim 2 wherein the the license plate is connectable with the backing portion of the adapter plate, the backing portion of the adapter plate being shaped to align with a connector portion of the vehicle, the backing member aligning and extending substantially in parallel with the backing portion of the adapter plate, and wherein the upper peripheral portion of the adapter plate is L-shaped and offset at least in part relative to the backing portion of the adapter plate.

4. The assembly as claimed in claim 2 wherein the lower portion of the resilient member has a planar front which abuts and extends along the upper peripheral portion of the adapter plate and has a planar rear opposite the planar front, the backing member substantially aligning with and covering the second side of the lower portion of the resilient member.

5. The assembly as claimed in claim 2 wherein the resilient member is made of rubber and wherein both the adapter plate and the backing member are made of sheet metal and are substantially rectangular in shape.

6. The assembly as claimed in claim 2 further including a plurality of connectors, wherein the adapter plate has a plurality of spaced-apart apertures extending therethrough at the upper peripheral portion thereof, wherein the lower portion of the resilient member has a plurality of spaced-apart apertures extending therethrough, wherein the backing member has a plurality of spaced-apart apertures extending therethrough, and wherein the plurality of spaced-apart apertures of the adapter plate, the lower portion of the resilient member and the backing member align with each other and are shaped to receive said connectors.

7. The assembly as claimed in claim 6 wherein the plurality of spaced-apart apertures extending along the upper peripheral portion of the adapter plate are rectangular and wherein each of the connectors comprises a carriage bolt and a nut shaped to threadably engage with said bolt.

8. The assembly as claimed in claim 1 wherein the the license plate is connectable with the backing portion of the adapter plate, the upper peripheral portion of the adapter plate being L-shaped and offset at least in part relative to the backing portion of the adapter plate.

9. The assembly as claimed in claim 8, the license plate having a recessed rear and a plurality of spaced-apart outer apertures extending therethrough, wherein the backing portion of the adapter plate is rectangular, has a top and includes a plurality of spaced-apart protrusions, the protrusions being embossments of the adapter plate configured to abut and support the recessed rear of the license plate, wherein the adapter plate has a plurality of outer apertures each of which extending through a respective one of the protrusions, the outer apertures of the adapter plate aligning with the outer apertures of the license plate, and wherein the upper peripheral portion of the adapter plate is integrally coupled to and formed with, extends along and extends outwards from the top of the backing portion of the adapter plate.

10. The assembly as claimed in claim 1 wherein the lower portion of the resilient member substantially aligns with and covers the upper peripheral portion of the adapter plate, and wherein the upper portion of the resilient member extends upwards from the upper peripheral portion of the adapter plate and is inwardly spaced relative to the lower portion of the resilient member.

11. The assembly as claimed in claim 1 wherein the resilient member has a pair of spaced-apart L-shaped ends each of which comprises parts of the upper and lower portions of the resilient member and wherein the upper portion of the resilient member is U-shaped in front and rear profile.

12. The assembly as claimed in claim 1 wherein the license plate is connectable with the backing portion of the adapter plate, and wherein the adapter plate includes a flange coupled to and extending outwards from the backing portion of the adapter plate.

13. The assembly as claimed in claim 12 wherein the resilient member abuts the flange.

14. The assembly as claimed in claim 1 wherein the adapter plate includes upper and lower flanges between which the license plate is connectable and wherein the resilient member couples to the adapter plate adjacent to the upper flange of the adapter plate.

15. The assembly as claimed in claim 1 wherein the resilient member is an elastomer.

16. The assembly as claimed in claim 1, the license plate having a recessed rear and having outer apertures extending therethrough, wherein the adapter plate includes a plurality of spaced-apart protrusions, the protrusions being configured to abut and support the recessed rear of the license plate, wherein the adapter plate has a plurality of outer apertures that at least partially extend through the protrusions and align with the outer apertures of the license plate, and wherein the assembly further includes a plurality of fasteners configured to extend through respective ones of the outer apertures, the license plate coupling to the adapter plate thereby.

17. In combination, a vehicle and the assembly as claimed in claim 1.

18. The assembly as claimed in claim 1, wherein the upper peripheral portion of the adapter plate is L-shaped in cross-section.

19. The assembly as claimed in claim 18 wherein the lower portion of the resilient member has a planar front which abuts the adapter plate and has a planar rear, and wherein the assembly further includes a backing member which couples to and covers the planar rear of the lower portion of the resilient member.

20. An adapter plate assembly for mounting a license plate to a vehicle, the assembly comprising:
    an adapter plate to which the license plate is connectable, the adapter plate having an upper peripheral portion;
    a resilient member having a first portion connectable with the adapter plate and a second portion connectable to the vehicle; and
    an elongate backing member, the first portion of the resilient member being connectable with and interposable between the backing member and the adapter plate, and the backing member and the upper peripheral portion of the adapter plate being shaped to form a receptacle within which the first portion of the resilient member is received.

21. The assembly as claimed in claim 20 wherein the resilient member is an elastomer.

22. An adapter plate assembly for mounting a license plate to a vehicle, the assembly comprising:
    an adapter plate including a backing portion to which the license plate is connectable and including an upper peripheral portion, the upper peripheral portion of the adapter plate being L-shaped and offset at least in part relative to the backing portion of the adapter plate; and
    a resilient member including a lower portion connectable with the upper peripheral portion of the adapter plate and including an upper portion connectable to the vehicle, the resilient member being configured to enable the license plate to move slightly forward and rearward.

23. The assembly as claimed in claim 22 wherein the resilient member is an elastomer.

\* \* \* \* \*

UNITED STATES PATENT AND TRADEMARK OFFICE
CERTIFICATE OF CORRECTION

| | | |
|---|---|---|
| PATENT NO. | : 9,902,344 B2 | Page 1 of 1 |
| APPLICATION NO. | : 15/098000 | |
| DATED | : February 27, 2018 | |
| INVENTOR(S) | : Darren Martin | |

It is certified that error appears in the above-identified patent and that said Letters Patent is hereby corrected as shown below:

In the Claims

Column 14, Line 5, should read:
3. The assembly as claimed in claim 2 wherein the license plate is connectable with the backing portion of the adapter plate, the backing portion of the adapter plate being shaped to align with a connector portion of the vehicle, the backing member aligning and extending substantially in parallel with the backing portion of the adapter plate, and wherein the upper peripheral portion of the adapter plate is L-shaped and offset at least in part relative to the backing portion of the adapter plate.

Column 14, Line 42, should read:
8. The assembly as claimed in claim 1 wherein the license plate is connectable with the backing portion of the adapter plate, the upper peripheral portion of the adapter plate being L-shaped and offset at least in part relative to the backing portion of the adapter plate.

Signed and Sealed this
First Day of May, 2018

Andrei Iancu
*Director of the United States Patent and Trademark Office*